US010050856B2

United States Patent
Oshiba

(10) Patent No.: US 10,050,856 B2
(45) Date of Patent: Aug. 14, 2018

(54) COMMUNICATION DEVICE, NETWORK AVAILABLE BANDWIDTH ESTIMATION METHOD IN COMMUNICATION DEVICE, AND STORAGE MEDIUM ON WHICH NETWORK AVAILABLE BANDWIDTH ESTIMATION PROGRAM HAS BEEN RECORDED

(71) Applicant: NEC Corporation, Minato-ku, Tokyo (JP)

(72) Inventor: Takashi Oshiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 15/030,742

(22) PCT Filed: Oct. 30, 2014

(86) PCT No.: PCT/JP2014/005498
§ 371 (c)(1),
(2) Date: Apr. 20, 2016

(87) PCT Pub. No.: WO2015/064108
PCT Pub. Date: May 7, 2015

(65) Prior Publication Data
US 2016/0254972 A1    Sep. 1, 2016

(30) Foreign Application Priority Data

Nov. 1, 2013    (JP) .................................. 2013-228292

(51) Int. Cl.
*H04L 12/58* (2006.01)
*H04L 12/26* (2006.01)
(Continued)

(52) U.S. Cl.
CPC ...... *H04L 43/0811* (2013.01); *H04L 43/0882* (2013.01); *H04L 47/00* (2013.01); *H04L 47/822* (2013.01)

(58) Field of Classification Search
CPC ............. H04L 43/0811; H04L 43/0882; H04L 47/822; H04L 47/00
See application file for complete search history.

(56) References Cited

U.S. PATENT DOCUMENTS 2,005,005 A  *  6/1935  Preston ..................... F23K 3/12
                                                    110/289
6,813,244 B1 *  11/2004  He ......................... H04L 41/046
                                                    370/235
(Continued)

FOREIGN PATENT DOCUMENTS

EP         1624632 A1 *  2/2006  ......... H04L 12/1827
JP      2006-074773 A     3/2006
(Continued)

OTHER PUBLICATIONS

S. Ekelin and M. Nilsson. "Continuous moni toring of available bandwidth over a network path". 2nd. Swedish National Computer Networking Workshop, Karlstad, Sweden, Nov. 23-24, 2004.*
(Continued)

*Primary Examiner* — Ricky Ngo
*Assistant Examiner* — Lan Huong Truong

(57) ABSTRACT

Provided is a communication apparatus including: data transmission-reception unit that is communicably connected to at least one terminal apparatus via a communication line; and bandwidth estimation unit. The bandwidth estimation unit is configured to generate particular information to be used to estimate an available bandwidth on the communication line, determine whether to transmit in series or in parallel the particular information for a particular one of the terminal apparatuses and the particular information for
(Continued)

another one of the terminal apparatuses, and estimate the available bandwidth of the communication line between the communication apparatus and terminal apparatuses, by transmitting, based at least part on the determination, the particular information for the particular terminal apparatus and the particular information for the another terminal apparatus, with uses of the data transmission-reception unit.

8 Claims, 9 Drawing Sheets

(51) Int. Cl.
  *H04L 12/70* (2013.01)
  *H04L 12/911* (2013.01)

(56) References Cited

U.S. PATENT DOCUMENTS

| | | | |
|---|---|---|---|
| 6,826,178 B1 * | 11/2004 | Leonard | H04J 3/0685 370/362 |
| 7,187,669 B1 * | 3/2007 | Lee | H04L 12/2861 370/347 |
| 8,069,465 B1 * | 11/2011 | Bartholomay | H04L 47/14 370/395.4 |
| 9,167,445 B2 * | 10/2015 | Hedlund | H04L 47/30 |
| 2007/0115804 A1 * | 5/2007 | Hibino | H04L 47/10 370/216 |
| 2007/0189290 A1 * | 8/2007 | Bauer | H04L 12/1836 370/390 |
| 2010/0333160 A1 * | 12/2010 | Flinta | H04L 12/1881 725/116 |
| 2012/0128002 A1 * | 5/2012 | Muramoto | H04L 1/0002 370/392 |
| 2012/0307661 A1 | 12/2012 | Oshiba | |

FOREIGN PATENT DOCUMENTS

| | | |
|---|---|---|
| JP | 2010-068067 A | 3/2010 |
| JP | 2011-142622 A | 7/2011 |
| JP | 2011-234370 A | 11/2011 |
| JP | 2012-015823 A | 1/2012 |
| JP | 2012-105051 A | 5/2012 |
| WO | 2010/146798 A1 | 12/2010 |
| WO | 2011/071127 A1 | 6/2011 |

OTHER PUBLICATIONS

International Search Report for PCT Application No. PCT/JP2014/005498, dated Jan. 13, 2015.
English translation of Written opinion for PCT Application No. PCT/JP2014/005498.

* cited by examiner

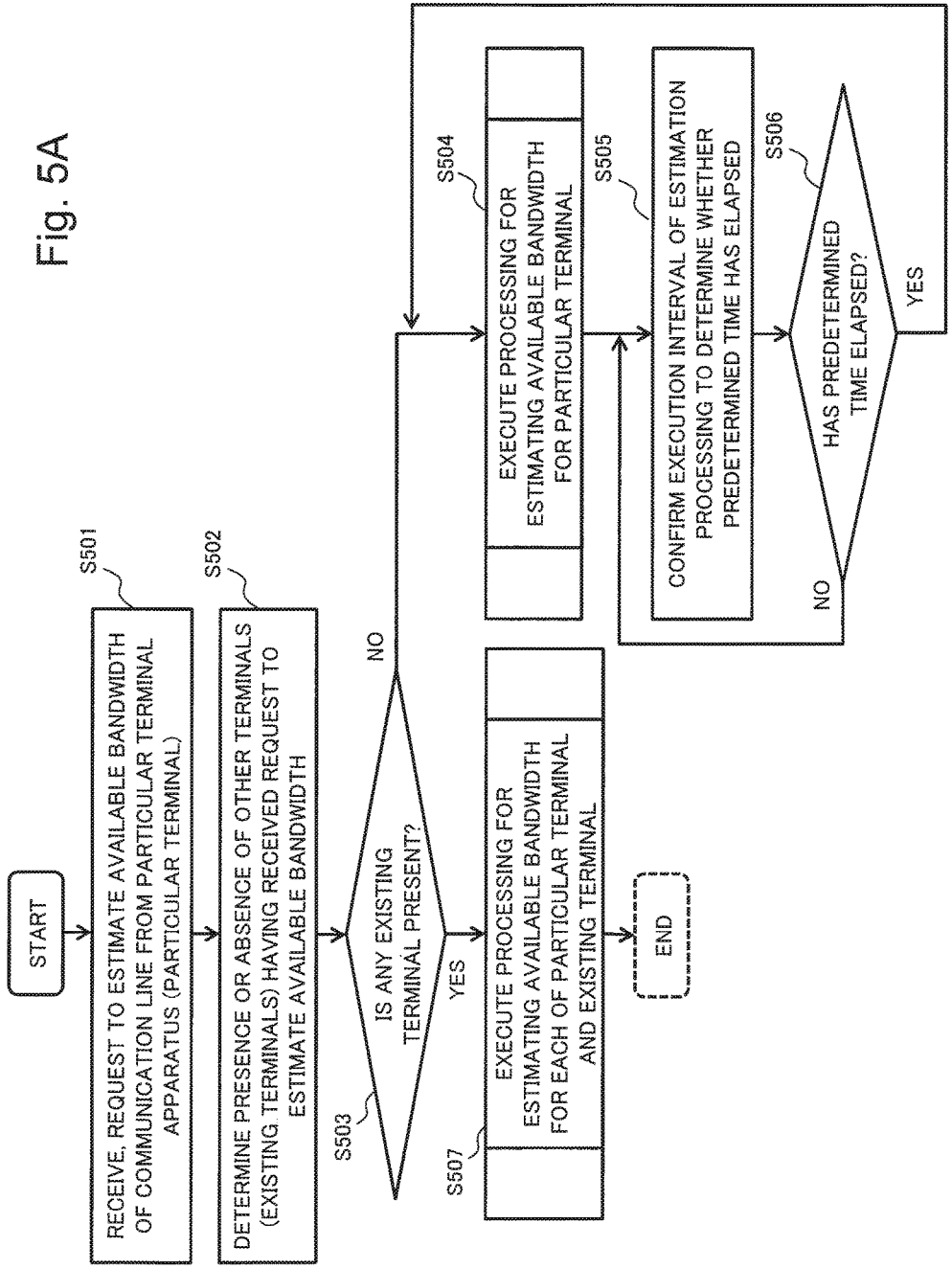

COMMUNICATION DEVICE, NETWORK AVAILABLE BANDWIDTH ESTIMATION METHOD IN COMMUNICATION DEVICE, AND STORAGE MEDIUM ON WHICH NETWORK AVAILABLE BANDWIDTH ESTIMATION PROGRAM HAS BEEN RECORDED

This application is a National Stage Entry of PCT/JP2014/005498 filed on Oct. 30, 2014 which claims priority from Japanese Patent Application 2013-228292 filed on Nov. 1, 2013, the contents of all of which are incorporated herein by reference, in their entirety.

TECHNICAL FIELD

The present invention relates to a technology for measuring an available bandwidth of a communication path in a communication network having a plurality of terminal apparatuses connected to it.

BACKGROUND ART

In recent years, a communication network that communicably connects a plurality of information processing terminals or the like to each other becomes popular. In such a communication network, a plurality of information processing terminals share a communication bandwidth of the communication network with each other.

In a communication network where a common communication bandwidth is shared, the available communication bandwidth means a free bandwidth calculated by subtracting from the physical bandwidth of a bottleneck link on a communication network (communication line), other traffic flowing through the network. The available communication bandwidth may be referred to as an "available bandwidth" hereinafter. Other traffic flowing through the network may be referred to as "cross traffic" hereinafter. When, for example, the physical bandwidth of a bottleneck link on a communication network is "100" Mbps (megabits per sec) and the cross traffic is "30" Mbps, the available bandwidth is "100−30=70" Mbps.

It is important to know an available bandwidth for a communication network, for example, when pieces of information such as sounds and images are transmitted each other in real time among terminals, or when a specific transaction is executed within a predetermined period of time by transmitting and receiving data.

For example, in an application such as video chat or videoconference in which data including video images and sounds is bidirectionally exchanged between terminals, it is possible to prevent data loss by controlling the transmission rate of video images and sounds within the range of known available bandwidth. A technologies technology for estimating an available bandwidth of a communication network and controlling data transmission and reception in accordance with the available bandwidth, becomes more important.

As technologies related to bandwidth estimation on a communication network, the following patent literatures, for example, are disclosed.

PTL 1 discloses a technology related to a network bandwidth measuring system, which estimates an available bandwidth of a communication network between a transmission apparatus and a reception apparatus. In the technology disclosed in PTL 1, the transmitting-side apparatus transmits a plurality of measurement packets (packet trains) arranged in ascending or descending order of size, to the receiving-side apparatus at a specific transmission interval. The receiving-side apparatus compares the transmission intervals of the measurement packets with their reception intervals. The receiving-side apparatus estimates an available bandwidth by using a largest measurement packet among measurement packets having equal transmission and reception intervals.

PTL 2 discloses a method for measuring an available bandwidth of a communication network. With the technology disclosed in PTL 2, a measuring-side communication apparatus transmits a plurality of measurement packets to a receiving-side apparatus at a specific transmission rate. The measuring-side communication apparatus receives the reception times of the plurality of measurement packets. Based on the reception time of each packet, the measuring-side communication apparatus measures a time difference of transmission delay occurring between the measurement packets, and examines a trend of change of the time difference. When the time difference increases or decreases, the measuring-side communication apparatus changes the transmission rate and executes measurement and examination again. The measuring-side communication apparatus estimates an available bandwidth using the transmission rate when the time difference falls within a stable range.

PTL 3 discloses a technology related to a method for measuring an available bandwidth of a communication network. The technology disclosed in PTL 3 is used to determine the order of transmission destination of measurement packet trains, for each of a plurality of communication apparatuses connected to each other via a communication network. Each communication apparatus transmits the measurement packet trains in accordance with the determined order. In the technology disclosed in PTL 3, the order of transmission of measurement packets is determined so as not to simultaneously transmit measurement packets from a plurality of communication apparatuses to a particular communication apparatus.

As technologies related to bandwidth control on a communication network, the following patent literatures, for example, are available.

PTL 4 discloses a technology for bandwidth control on a communication network in delivering stream data from a particular root (delivery source) terminal to other terminals. The technology disclosed in PTL 4 is used to allocate part of an upload link bandwidth measured for each terminal to deliver stream data, and allocates the remainder of the upload link bandwidth to deliver data associated with the stream data.

PTL 5 discloses a technology related to a network switch, which controls a storm (abnormal transmission) of broadcast packets. With the technology disclosed in PTL 5, the network switch measures broadcast packets and other normal packets, which occupy traffic on a communication network. The network switch analyzes a bandwidth occupying rate of broadcast packets at which the broadcast packets have no influence on other normal packets, based on the measurement result. The network switch calculates a threshold used as a criterion for a stream (abnormal transmission) on the basis of the analysis result, and adjusts the amount of communication of broadcast packets on the basis of the threshold. PTL 6 discloses a technology for adjusting the streaming quality of the digital content based on the estimation result of an available bandwidth. PTL 7 discloses a technology for allocating a communication bandwidth requested by one subscriber apparatus to a communication channel that is not used by another subscriber apparatus, in a network that allows a plurality of subscriber apparatuses to share a bandwidth with each other.

CITATION LIST

Patent Literature

[PTL 1] Japanese Unexamined Patent Application Publication No. 2011-142622
[PTL 2] Japanese Unexamined Patent Application Publication No. 2006-074773
[PTL 3] International Publication WO 2011/071127
[PTL 4] International Publication WO 2010/146798
[PTL 5] Japanese Unexamined Patent Application Publication No. 2012-105051
[PTL 6] Japanese Unexamined Patent Application Publication No. 2011-234370
[PTL 7] Japanese Unexamined Patent Application Publication No. 2010-068067

SUMMARY OF INVENTION

Technical Problem

In the communication network of recent years, a particular communication apparatus (for example, a server apparatus) may deliver communication data to a plurality of terminal apparatuses connected to each other via the communication network. The particular communication apparatus and terminal apparatuses as delivery destinations for communication data may be connected to each other via communication networks having different available bandwidths. In such a case, an available bandwidth of the communication network between the particular communication apparatus and the terminal apparatus needs to be estimated for each terminal apparatus.

PTLs 1 and 2 disclose technologies for estimating available bandwidths of communication networks when communication apparatuses are connected to each other in a one-to-one via the communication networks. When the technologies are applied to the environment in which a plurality of terminal apparatuses are connected to a server apparatus, the following two methods may be considerable.

As the first method, available bandwidths may be estimated one by one for each of terminal apparatuses in series. With this method, for example, operations for transmitting measurement data from the server apparatus to respective terminal apparatuses are sequentially executed one by one. When, for example, the first method is executed using the technology disclosed in PTL 1, the server apparatus may transmit measurement packets (packet trains) to a particular terminal and then transmit measurement packets to the next terminal.

As the second method, available bandwidths may be estimated concurrently and parallelly, for a plurality of terminal apparatuses. With this method, for example, operations for transmitting measurement data from the server apparatus to respective terminal apparatuses are executed parallelly at once. When, for example, the second method is executed using the technology disclosed in PTL 1, the server apparatus may transmit measurement packets to a particular terminal apparatus in parallel to transmission of measurement packets to other terminal apparatuses.

However, when the two methods are directly adopted, it is difficult to estimate an available bandwidth for each terminal apparatus in a short time with high precision, for the following reasons.

First, when the first method is simply employed, the server apparatus estimates available bandwidths for all terminal apparatuses in order. Thus, it may take a long time to estimate available bandwidths. When, for example, the first method is executed using the technology disclosed in PTL 1, the processing time taken to estimate available bandwidths for a plurality of terminal apparatuses increases in proportion to the number of terminal apparatuses.

Next, when the second method is directly adopted, the server apparatus concurrently and parallelly estimates available bandwidths for a large number of terminal apparatuses. Thus, a large volume of measurement data for estimation process may be transmitted and received. The estimation precision of an available bandwidth may be degraded because of the suppression of bandwidth of the communication network caused by the measurement data.

When, for example, the second method is executed using the technology disclosed in PTL 1, measurement packets are transmitted to respective terminal apparatuses in parallel. In general, the network where the server apparatus is arranged has a broad available bandwidth of a communication network, and therefore the network can simultaneously transmit a large number of measurement packets. However, for example, when a plurality of terminal apparatuses share a communication network having a narrow available bandwidth, such as a mobile network or a wireless network, measurement packets associated with these terminals may cause to suppress the available bandwidth of the communication network. This may delay arrival of the measurement packets at the terminals.

As a result, even if the communication network itself, having the terminals connected to it, is not congested (except for measurement packets), the reception interval of measurement packets in each terminal apparatus becomes comparatively long, and this may degrade the estimation precision of an available bandwidth.

As described above, PTLs 1 and 2 only disclose technologies for mainly estimating an available bandwidth between communication apparatuses connected to each other in a one-to-one, and therefore, these technologies are insufficient to solve the aforementioned problems.

The technology disclosed in PTL 3 primises the use of a communication network connecting terminal apparatuses to each other in a full-mesh configuration. And, in the technology disclosed in PTL 3, the order of transmission of measurement data is determined in advance for each terminal apparatus. Thus, since processes for estimating an available bandwidth in each terminal apparatus, are supposed to be executed in series (in accordance with the determined order), and therefore the technology disclosed in PTL 3 is insufficient to solve the aforementioned problems.

The technologies disclosed in PTLs 4, 5, and 7 are not technologies for estimating a bandwidth of a communication network but technologies related to bandwidth allocation, and are therefore insufficient to solve the aforementioned problems. PTL 6 is technology that simply estimate a bandwidth based on the size and time of received data, and is not intended to estimate a bandwidth using measurement packets.

The present invention has been made to deal with the above-described problems. It is a main object of the present invention to provide, for example, a communication apparatus and a network available bandwidth estimation method which estimate, in a communication network that connects a plurality of terminal apparatuses to a particular communication apparatus, an available bandwidth for each terminal apparatus in a short time with high precision.

Solution to Problem

To achieve the object described above, a communication apparatus according to one aspect of the present invention is configured as follows. That is, the communication apparatus according to one aspect of the present invention includes: data transmission-reception unit communicably connected to at least one terminal apparatus via a communication line; and bandwidth estimation unit for generating particular information to be used to estimate an available bandwidth on the communication line, determining whether to transmit in series or in parallel the particular information for a particular one of the terminal apparatuses and the particular information for another one of the terminal apparatuses, and estimating the available bandwidth of the communication line between the communication apparatus and terminal apparatuses, by transmitting, based at least in part on the determination, the particular information for the particular terminal apparatus and the particular information for the another terminal apparatus, with uses of the data transmission-reception unit.

A available bandwidth estimation method for a communication line according to one aspect of the present invention is configured as follows. That is, the available bandwidth estimation method for a communication line according to one aspect of the present invention includes, by a communication apparatus communicably connected to at least one terminal apparatus via a communication line: generating particular information for estimating an available bandwidth on the communication line; determining whether to transmit in series or in parallel the particular information for a particular one of the terminal apparatuses and the particular information for another one of the terminal apparatuses; and estimating the available bandwidth of the communication line between the communication apparatus and each of the terminal apparatuses, by transmitting, based on the determination, the particular information for the particular terminal apparatus and the particular information for the other terminal apparatuses.

A computer program according to one aspect of the present invention is configured as follows. That is, the computer program according to one aspect of the present invention is executed by a computer that controls an operation of a communication apparatus communicably connected to at least one terminal apparatus via a communication line, the program causing the computer to execute the processes of: generating particular information for estimating an available bandwidth on the communication line; determining whether to transmit in series or in parallel the particular information for a particular one of the terminal apparatuses and the particular information for another one of the terminal apparatuses; and estimating the available bandwidth of the communication line between the communication apparatus and each of the terminal apparatuses by transmitting, based on the determination, the particular information associated with the particular terminal apparatus and the particular information associated with the other terminal apparatuses.

The above-described object of the present invention can also be achieved by a computer-readable storage medium storing the storage control program.

Advantageous Effects of Invention

According to the above-described present invention, in a communication network that connects a plurality of terminal apparatuses to a particular communication apparatus, an available bandwidth can be estimated for each terminal apparatus with high speed and high precision by a combination of processing for estimating available bandwidths in series and processing for estimating available bandwidths in parallel.

BRIEF DESCRIPTION OF DRAWINGS

FIG. 5A is a flowchart illustrating exemplary processing for estimating an available bandwidth of a communication network between a server apparatus and a terminal apparatus in the second exemplary embodiment of the present invention.

DESCRIPTION OF EMBODIMENTS

Exemplary embodiments of the present invention will be described in detail below with reference to the drawings.

First Exemplary Embodiment

Figure 1:
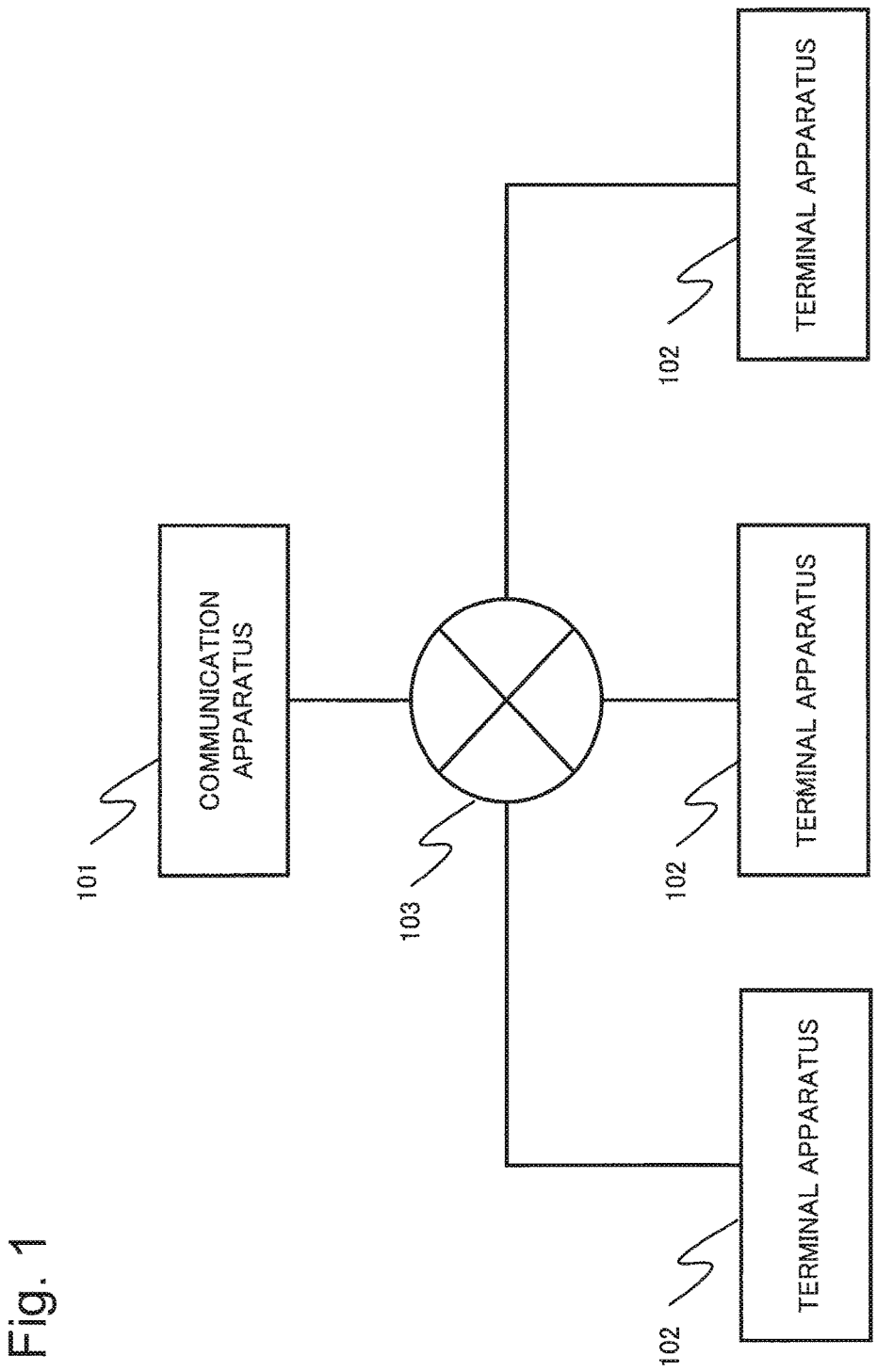
FIG. 1 is a diagram illustrating an exemplary configuration of a communication network according to each exemplary embodiment of the present invention.
Figure 2:
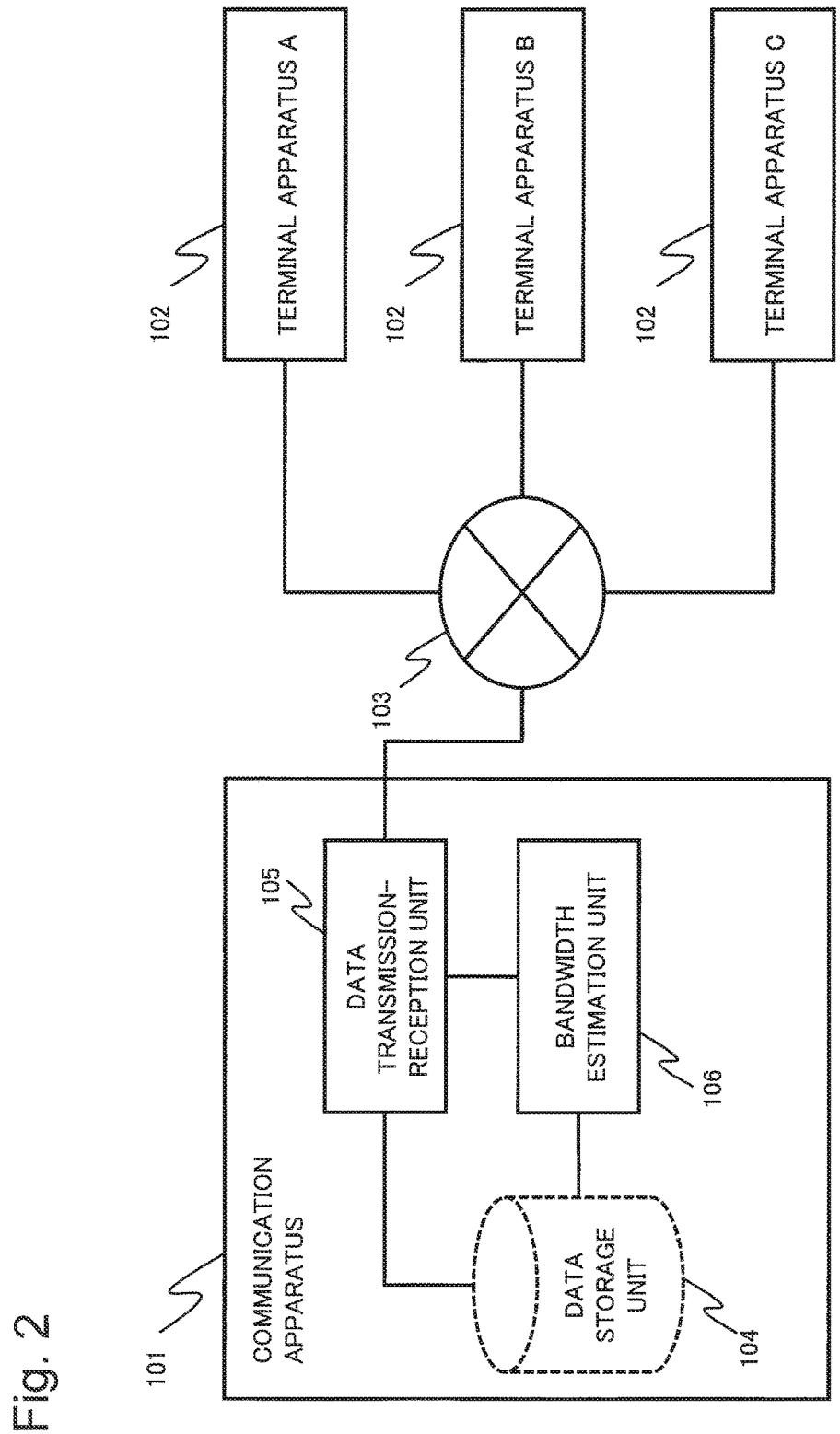
FIG. 2 is a block diagram illustrating an exemplary functional configuration of a communication apparatus in a first exemplary embodiment of the present invention.

A communication apparatus in a first exemplary embodiment of the present invention will be described below with reference to FIGS. 1 and 2. FIG. 1 is a diagram illustrating an exemplary configuration of a communication network according to the first exemplary embodiment of the present invention. FIG. 2 is a block diagram illustrating an exemplary functional configuration of a communication apparatus in the first exemplary embodiment of the present invention.

Referring first to FIG. 1, a communication apparatus 101 is communicably connected to at least one terminal apparatus 102 via a communication network (communication line) 103. The communication apparatus 101 transmits and receives various types of data between itself and the terminal apparatuses 102 via the communication network 103.

The communication network 103 may be, for example, an IP (Internet Protocol) network, or adopt other arbitrary electrical communication lines. Further, the communication network may be implemented by using wired connection network in part or all, or may be implemented by using wireless connection network in part or all.

The communication apparatus 101 and the terminal apparatuses 102 according to the present exemplary embodiment may be, for example, an arbitrary apparatus having the following functions of transmitting and receiving information (data) via a communication network:

- a Personal Computer (PC);
- a mobile information terminal such as a Personal Digital Assistant (PDA);
- a mobile phone, a smartphone, or a landline phone;
- a tablet terminal;
- a street multimedia terminal;
- an in-vehicle terminal;
- a gaming machine;
- a television equipped with the network connection function;
- a set-top box equipped with the network connection function;
- a printer equipped with the network connection function;
- a scanner equipped with the network connection function;
- a base station for mobile phones or the like;
- an access point for wireless communication; and
- a router, a switch, a network relay apparatus, or the like.

The present exemplary embodiment includes a configuration that the apparatus 102 of any number more than at least one, is connected to the communication network 103. The present exemplary embodiment also includes a configuration that the communication apparatus 101 of any number more than at least one, is connected to the communication network 103.

The configuration of the communication apparatus 101 in the present exemplary embodiment will be described in the following, with reference to FIG. 2.

The communication apparatus 101 in the present exemplary embodiment includes a data transmission-reception unit 105 and a bandwidth estimation unit 106. The communication apparatus 101 in the present exemplary embodiment may further include a data storage unit 104.

The data transmission-reception unit 105 in the present exemplary embodiment is communicably connected to the communication network 103. The data transmission-reception unit 105 transmits and receives various types of data to and from the terminal apparatuses 102 via the communication network 103. The data transmission-reception unit 105 further transmits and receives particular information (for example, measurement data (to be described later)) to be used to estimate an available bandwidth on the communication network 103 that communicably connects the communication apparatus 101 to each terminal apparatus 102, based on an instruction from the bandwidth estimation unit 106 (to be described later). The data transmission-reception unit 105 in the present exemplary embodiment may transfer, to the bandwidth estimation unit 106 (to be described later), a response about processing for estimating the available bandwidth, that is received from each terminal apparatus 102.

The bandwidth estimation unit 106 in the present exemplary embodiment executes processing for estimating an available bandwidth on a communication network that communicably connects the terminal apparatuses 102 to each other. The bandwidth estimation unit 106 in the present exemplary embodiment may, for example, generate particular information to be transmitted to each terminal apparatus 102, on estimating the available bandwidth. The bandwidth estimation unit 106 in the present exemplary embodiment may, for example, generate as the particular information, measurement data for measuring an available bandwidth on the communication network 103 that communicably connects the communication apparatus 101 to each terminal apparatus 102.

The bandwidth estimation unit 106 in the present exemplary embodiment may, for example, determine whether to transmit the measurement data to respective terminal apparatuses in series or in parallel in the estimation processing.

When measurement data are determined to be transmitted in series, the bandwidth estimation unit 106 may serially transmit the measurement data to respective terminal apparatuses one by one. In this case, the bandwidth estimation unit 106 may, for example, transmit the measurement data to terminal apparatus "A" illustrated in FIG. 2 and then to another terminal apparatus "B".

When measurement data are determined to be transmitted in parallel, the bandwidth estimation unit 106 may transmit the measurement data to respective terminal apparatuses in parallel. In this case, the bandwidth estimation unit 106 may, for example, transmit the measurement data to terminal apparatus "A" illustrated in FIG. 2 in parallel to transmitting the measurement data to other terminal apparatuses "B" and "C". The bandwidth estimation unit 106 may insert processing for transmitting measurement data to other terminal apparatuses 102, in the middle of processing for transmitting measurement data to a particular terminal apparatus 102.

The bandwidth estimation unit 106 in the present exemplary embodiment transmits the measurement data using the data transmission-reception unit 105.

The communication apparatus 101 in the present exemplary embodiment may include a data storage unit 104. The data storage unit 104 in the present exemplary embodiment may, for example, store information about each terminal apparatus 102, including information indicating transmission destination of the measurement data, an estimated value of the available bandwidth when the measurement data are transmitted to respective terminal apparatuses 102 in series or in parallel, the order and interval of transmission of the measurement data to each terminal apparatus, and the like.

The operation of the communication apparatus 101 in the present exemplary embodiment configured as described above will be described next.

The communication apparatus 101 in the present exemplary embodiment, for example, receives an estimate request for the available bandwidth, transmitted from a particular terminal apparatus 102 (for example, terminal apparatus "A" illustrated in FIG. 1). The data transmission-reception unit 105 in the communication apparatus 101 may transfer, to the bandwidth estimation unit 106, the estimate request received from the particular terminal apparatus 102.

The bandwidth estimation unit 106 generates measurement data to be used to estimate an available bandwidth on the communication network that connects the terminal apparatuses 102 to each other. The bandwidth estimation unit 106 determines whether to transmit in series or in parallel the generated measurement data to each of a particular terminal apparatus and other terminal apparatuses connected to the communication network 103.

In the present exemplary embodiment, the bandwidth estimation unit 106 may, for example, determine whether to transmit measurement data to respective terminal apparatuses in series or in parallel, based on determination as to whether transmission of the measurement data causes to suppress the available bandwidth of the communication network 103.

The bandwidth estimation unit 106 may, for example, measure separately, whether the measurement data for a particular terminal apparatus 102 and the measurement data for other terminal apparatuses 102 collide with each other on the communication network 103 between the communication apparatus 101 and each terminal apparatus 102. Based on the measurement result, bandwidth estimation unit 106 may determine whether to transmit the measurement data to respective terminal apparatuses in series or in parallel.

The bandwidth estimation unit 106 transmits the generated measurement data to each terminal apparatus, based on the determination. At this time, the bandwidth estimation unit 106 in the present exemplary embodiment transmits the generated measurement data using the data transmission-reception unit 105.

The data transmission-reception unit 105 transmits the measurement data to each terminal apparatus 102 via the communication network 103, based on an instruction from the bandwidth estimation unit 106.

In the present exemplary embodiment, each terminal apparatus 102 may, for example, calculate an estimated value of the available bandwidth on the communication network 103 between each terminal apparatus 102 and the communication apparatus 101, based on the measurement data received from the communication apparatus 101. In this case, each terminal apparatus 102 may transmit the estimated value that is calculated above to the communication apparatus 101 as response data.

In the present exemplary embodiment, the data transmission-reception unit 105 in the communication apparatus 101 may receive the response data that is transmitted from each of the terminal apparatuses 102, and transfer the received response data to the bandwidth estimation unit 106. In this case, the bandwidth estimation unit 106 may estimate an available bandwidth between the communication apparatus and each terminal apparatus, based on the estimated value received from each terminal apparatus 102.

With the communication apparatus 101 according to the present exemplary embodiment configured as described above, the bandwidth estimation unit 106 determines whether to transmit, in series, or in parallel, measurement data used for estimating available bandwidths to respective terminal apparatuses 102, and transmits the measurement data to the respective terminal apparatuses 102 based on this determination. Therefore, the communication apparatus 101 in the present exemplary embodiment can rapidly estimate an available bandwidth between the communication apparatus and each of terminal apparatuses, to which the measurement data are transmitted in parallel. The communication apparatus 101 can estimate an available bandwidth with high precision, between the communication apparatus and each terminal apparatus 102 to which the measurement data are transmitted in a series manner.

More specifically, when there is more than one terminal apparatuses, which is determined that the measurement data are to be transmitted in series, the communication apparatus 101 sequentially transmits estimation data one by one, so as not to cause the estimation data suppress the bandwidth of the communication network between the communication apparatus 101 and each terminal apparatus 102. With such processing, the communication apparatus 101 in the present exemplary embodiment can estimate an available bandwidth with high precision, for each terminal apparatus 102 in the communication network 103 to which the terminal apparatuses 102 is connected.

In the present exemplary embodiment, the communication apparatus 101 may function as a terminal apparatus 102, or the terminal apparatus 102 may function as a communication apparatus 101.

In the present exemplary embodiment, even if the communication apparatus 101 has not received request for estimating an available bandwidth from the terminal apparatus 102, the communication apparatus 101 may execute processing for estimating an available bandwidth of the communication network between the communication apparatus 101 and each terminal apparatus 102. The communication apparatus 101 may, for example, periodically execute processing for estimating the available bandwidth between the communication apparatus and each terminal apparatus, or may execute the above processing at a specific timing.

Second Exemplary Embodiment

A second exemplary embodiment of the present invention will be described below. Hereinafter, characteristic configurations according to the present exemplary embodiment will be mainly described. Same reference numbers as the first exemplary embodiment are assigned to configurations according to the present exemplary embodiment, which is similar to those in the above-described first exemplary embodiment, and a detailed description thereof will be omitted.

Figure 3:
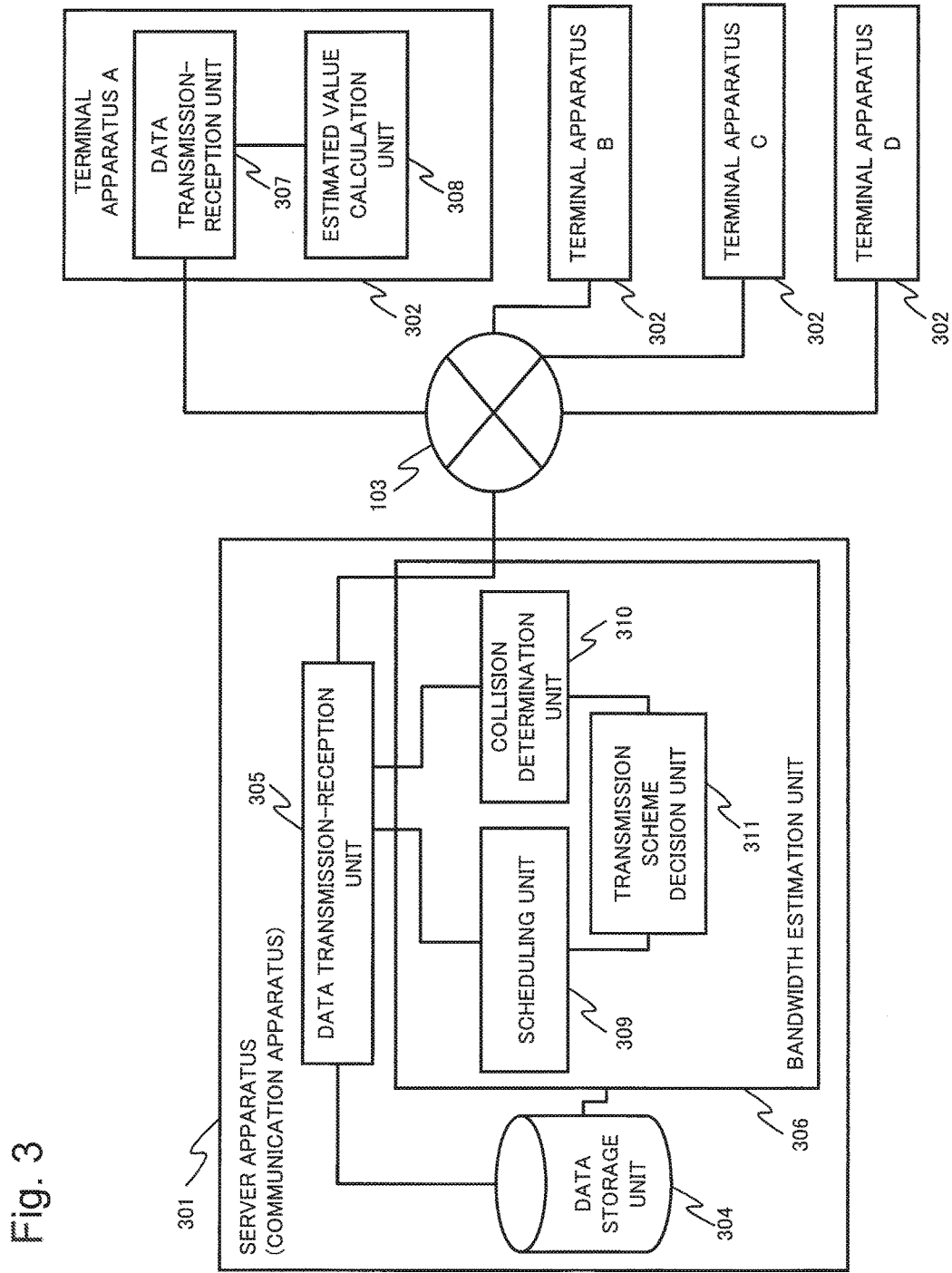
FIG. 3 is a block diagram illustrating an exemplary functional configuration of a communication apparatus in a second exemplary embodiment of the present invention.

The configuration and operation of a server apparatus 301 in the present exemplary embodiment will be described below with reference to FIG. 3. FIG. 3 is a block diagram illustrating an exemplary functional configuration of a communication apparatus in the second exemplary embodiment of the present invention.

In the present exemplary embodiment, the server apparatus 301 comparable to the communication apparatus 101 in the above-described first exemplary embodiment is connected to at least one terminal apparatus 302 via a communication network 103. The server apparatus 301 transmits and receives various types of data to and from each terminal apparatus 302 via the communication network 103.

The communication network 103 in the present exemplary embodiment may have similar configuration as that of the communication network 103 in the above-described first exemplary embodiment. The server apparatus 301 and the terminal apparatuses 302 in the present exemplary embodiment may be, for example, an arbitrary apparatus having the functions of transmitting and receiving information (data) via a communication network, as in the above-described first exemplary embodiment.

The configuration of the server apparatus 301 in the present exemplary embodiment will be described first. The server apparatus 301 in the present exemplary embodiment includes a data transmission-reception unit 305, a bandwidth estimation unit 306, and a data storage unit 304 (for example, a database or a storage device).

The data transmission-reception unit 305 in the present exemplary embodiment is communicably connected to the communication network 103, like the data transmission-reception unit 105 in the above-described first exemplary embodiment. The data transmission-reception unit 305 transmits and receives various types of data that includes measurement data, to and from the terminal apparatuses 302 via the communication network 103. When the communication network 103 is configured as an IP network, the data transmission-reception unit 305 in the present exemplary embodiment may process data, being transmitted to and received from each terminal apparatus 302, into the form of IP packets and transmit and receive the data.

The data transmission-reception unit 305 in the present exemplary embodiment may transfer data regarding to processing for estimating the available bandwidth, being received from each terminal apparatus 302, to the bandwidth estimation unit 306 (to be described later).

The configuration of the bandwidth estimation unit 306 in the present exemplary embodiment will be described next. The bandwidth estimation unit 306 in the present exemplary embodiment includes a scheduling unit 309, a collision determination unit 310, and a transmission scheme decision unit 311.

The bandwidth estimation unit 306 in the present exemplary embodiment executes processing for estimating an available bandwidth on a communication network between the server apparatus 301 and each terminal apparatus 302, as in the above-described first exemplary embodiment. The bandwidth estimation unit 306 in the present exemplary embodiment may, for example, generate measurement data to be used for estimating the available bandwidth.

The scheduling unit 309 in the present exemplary embodiment adjusts the schedule of processing for transmitting the generated measurement data to each terminal apparatus 302. When, for example, the measurement data includes a plurality of packets, the scheduling unit 309 may adjust the transmission schedule of each packet.

The collision determination unit 310 in the present exemplary embodiment determines whether the measurement data for a particular terminal apparatus 302 and the measurement data for other terminal apparatuses 302 have collided in the path of the communication network 103. Details of specific determination processing in the collision determination unit 310 will be described later.

The transmission scheme decision unit 311 in the present exemplary embodiment determines the order and scheme of transmission of the measurement data for each terminal apparatus 302, based on the determination result obtained by the collision determination unit 310. The transmission scheme means herein, for example, either a scheme in which the measurement data are transmitted to respective terminal apparatuses 302 in series, or a scheme in which the measurement data are transmitted to respective terminal apparatuses 302 in parallel.

Figure 4:
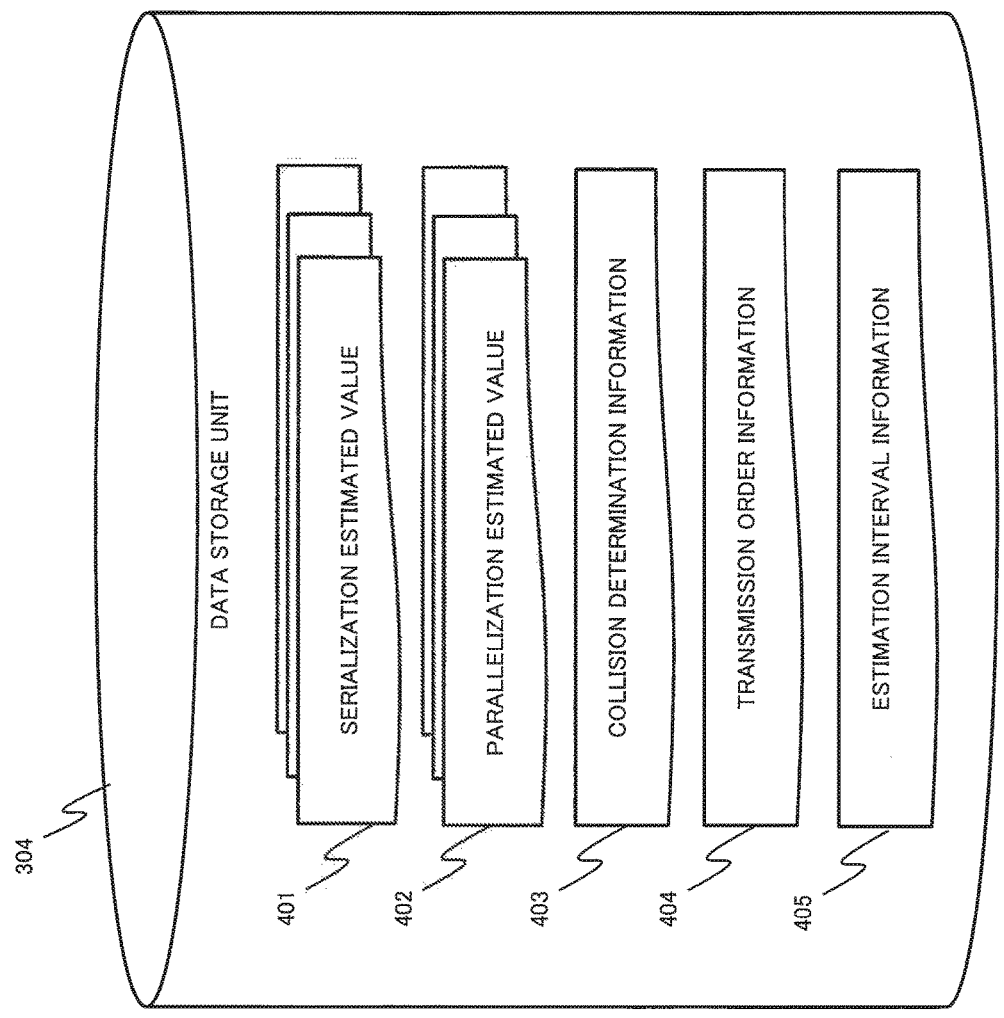
FIG. 4 is an explanatory illustrating an exemplary structure of data stored in a data storage unit in the block diagram illustrated in FIG. 3.

The data storage unit 304 in the present exemplary embodiment stores various types of data associated with estimation of an available bandwidth for each terminal apparatus 302. Various types of data stored in the data storage unit 304 will be described below with reference to FIG. 4. FIG. 4 is a diagram illustrating an exemplary structure of data stored in the data storage unit 304.

A serialization estimated value 401 in the present exemplary embodiment is an area for storing an estimated value of the available bandwidth for each terminal apparatus, when the measurement data for the particular terminal apparatus 302 and the measurement data for other terminal apparatuses 302 are transmitted in series. The serialization estimated value 401 is recorded in association with each terminal apparatus.

A parallelization estimated value 402 in the present exemplary embodiment is an area for storing an estimated value of the available bandwidth calculated for each terminal apparatus, when the measurement data for a particular terminal apparatus 302 and the measurement data for other terminal apparatuses 302, are transmitted in parallel. The parallelization estimated value 402 is recorded in association with each terminal apparatus.

Collision determination information 403 in the present exemplary embodiment is an area for storing a value to be used for determining whether the measurement data for respective terminal apparatuses 302 have collided with each other on the communication network 103.

Transmission order information 404 in the present exemplary embodiment is an area for storing, for example, the order of transmission of the measurement data to each terminal apparatus 302 connected to the communication network 103. The transmission order information 404 may also store information about terminal apparatuses 302 to which the measurement data are transmitted in parallel and information about terminal apparatuses 302 to which the measurement data are transmitted in serial.

More specifically, the transmission order information 404 may store information indicating a set of terminal apparatuses to be serialized and a set of terminal apparatuses to be parallelized, in transmitting the measurement data, as the order of transmission of measurement data.

Estimation interval information 405 in the present exemplary embodiment is, for example, a storage area for storing a value associated with the interval of periodical execution of processing for estimating an available bandwidth between the server apparatus 301 and each terminal apparatus 302. For example, the estimation interval information 405 in the present exemplary embodiment may indicate the value of the time interval at which processing for estimating the available bandwidth is executed. In this case, the bandwidth estimation unit 306 may execute processing for estimating the available bandwidth once, and start the next processing for estimating the available bandwidth after elapse of the time recorded in the estimation interval information 405.

The configurations of the terminal apparatuses 302 in the present exemplary embodiment will be described next. FIG. 3 illustrates, as examples of the terminal apparatuses 302, terminal apparatuses "A" to "D", which may have equivalent configurations.

The terminal apparatus 302 in the present exemplary embodiment includes a data transmission-reception unit 307 and an estimated value calculation unit 308.

The data transmission-reception unit 307 receives the measurement data transmitted from the server apparatus 301. In this case, the data transmission-reception unit 307 may, for example, transfer the received measurement data to the estimated value calculation unit 308 (to be described later). The data transmission-reception unit 307 further transmits to the server apparatus 301, an estimated value of the available bandwidth between the server apparatus 301 and the terminal apparatus 302, which is calculated by the estimated value calculation unit 308.

The estimated value calculation unit 308 calculates an estimated value of the available bandwidth on the communication network 103 between the server apparatus 301 and the terminal apparatus 302, based on the measurement data transferred by the data transmission-reception unit 307.

Figure 5B:
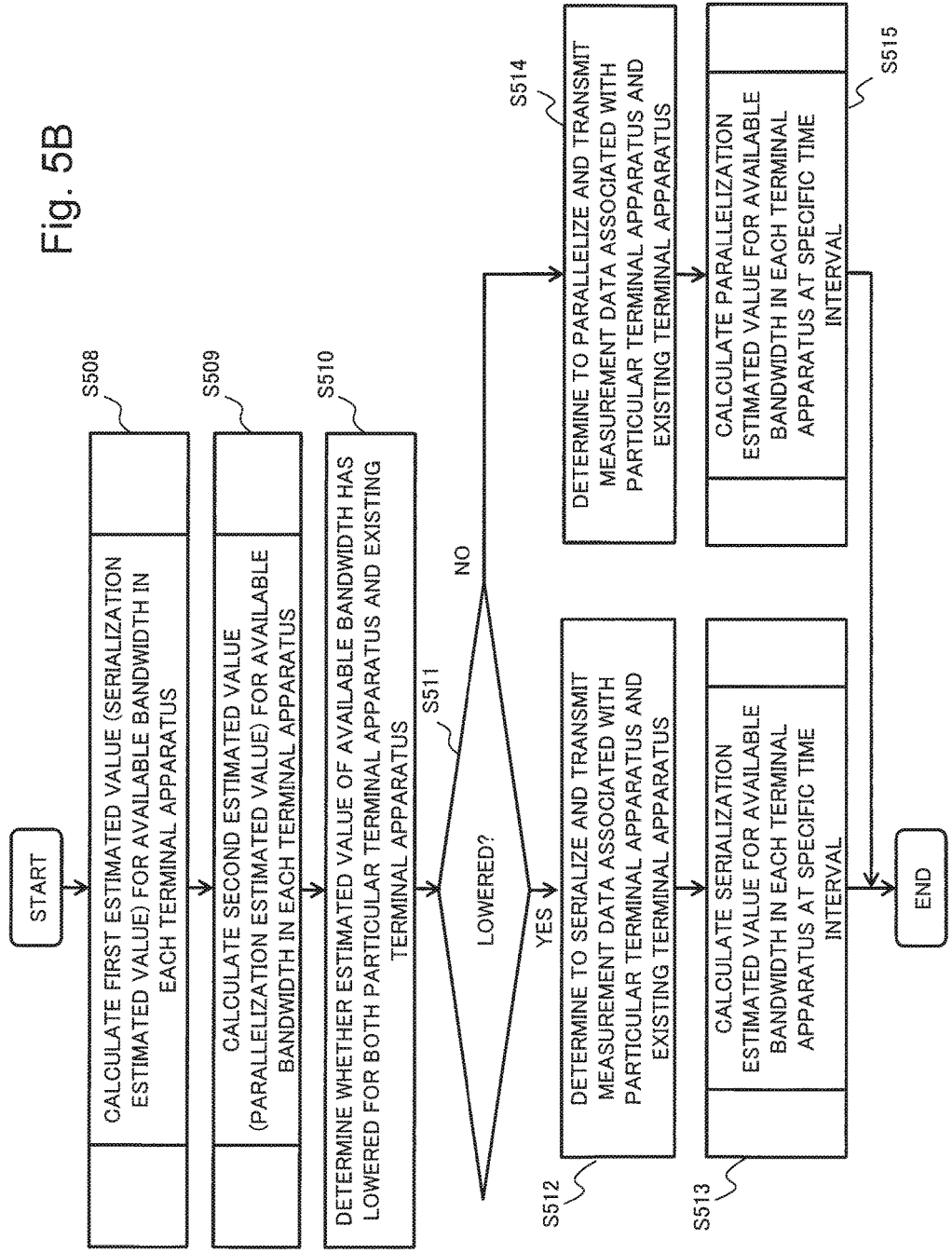
FIG. 5B is a flowchart illustrating another exemplary processing for estimating an available bandwidth of the communication network between the server apparatus and the terminal apparatus in the second exemplary embodiment of the present invention.

The operations of the server apparatus 301 and the terminal apparatus 302 in the present exemplary embodiment, having the above-described configuration, will be described next with reference to FIGS. 5A and 5B. FIGS. 5A and 5B are flowcharts illustrating exemplary processing for estimating an available bandwidth of a communication network between the server apparatus and the terminal apparatus in the second exemplary embodiment of the present invention.

In the present exemplary embodiment, a particular terminal apparatus 302 connected to the communication network 103 may be referred to as the "particular terminal" hereinafter. Examples of the particular terminal may include a terminal that is connected to the communication network 103 and transmits a new request to estimate an available bandwidth to the server apparatus 301.

First, the server apparatus 301 receives from a terminal apparatus 302 acting as the particular terminal connected to the communication network 103, a request to estimate an available bandwidth of the communication network 103 between the terminal apparatus 302 and the server apparatus 301 (step S501 in FIG. 5A).

The estimate request transmitted from the terminal apparatus 302 to the server apparatus 301 may use an arbitrary scheme or protocol. When, for example, the communication network 103 in the present exemplary embodiment is an IP network, the terminal apparatus 302 may process data representing the estimate request into the form of IP packets and transmit the data to the server apparatus 301.

In step S501, the data transmission-reception unit 305 in the server apparatus 301 receives the estimate request transmitted from the particular terminal. In this case, the bandwidth estimation unit 306 may record information related to the particular terminal in the data storage unit 304. The information related to the particular terminal may include, for example, information related to an address of the particular terminal in the communication network 103, and information related to the reception time of the estimate request.

The bandwidth estimation unit 306 determines whether a terminal apparatus 302 (referred to as an "existing terminal" hereinafter in the present exemplary embodiment) that is other than the particular terminal and that has transmitted a request to estimate an available bandwidth to the server apparatus 301, is present or not (step S502 in FIG. 5A).

For example, the bandwidth estimation unit 306 may store, in the data storage unit 304, information about the terminal apparatus 302 that has transmitted a request to estimate an available bandwidth to the server apparatus 301, and determine whether the existing terminal is present based on the information. In the present exemplary embodiment, a plurality of existing terminals may be present.

When the existing terminal is determined to be present in step S502, (YES in step S503), processing for estimating an available bandwidth between the server apparatus 301 and each of the particular terminal and the existing terminal is performed (step S507). The processes subsequent to step S507 will be described in detail later.

When it is determined in step S502 that there is no existing terminal (NO in step S503), the bandwidth estimation unit 306 performs processing for estimating an available bandwidth for the particular terminal (step S504).

The bandwidth estimation unit 306 in the present exemplary embodiment may, for example, estimate an available bandwidth between the server apparatus and the particular terminal, using the technology disclosed in PTL 1. In this case, for example, the bandwidth estimation unit 306 generates a plurality of measurement packets (to be sometimes referred to as "packet trains" hereinafter) that form measurement data for the particular terminal.

The scheduling unit 309 adjusts the transmission schedule (transmission timing) of the packet trains. The scheduling unit 309 transmits the packet trains to the particular terminal using the data transmission-reception unit 305 in accordance with the transmission schedule.

The data transmission-reception unit 307, which constitutes the particular terminal, receives the packet trains transmitted from the server apparatus 301. The data transmission-reception unit 307 may, for example, transfer the received packet trains to the estimated value calculation unit 308.

The estimated value calculation unit 308 in a particular terminal may, for example, analyze the packet trains and calculate an estimated value of the available bandwidth between the particular terminal and the server apparatus 301, using the technology described in PTL 1. The estimated value calculation unit 308 may transmit estimated value that is calculated above, to the server apparatus 301 as response data, using the data transmission-reception unit 307.

The bandwidth estimation unit 306 in the server apparatus 301 may determine as an estimated value of the available bandwidth, the calculated value of the available bandwidth included in the response data received from the particular terminal. In this case, the bandwidth estimation unit 306 may record the estimated value in the data storage unit 304.

The bandwidth estimation unit 306 then determines whether the time recorded in the estimation interval information 405 has elapsed (step S505).

When it is determined, as the determination result in step S505, that the time corresponding to the execution interval of estimation processing has elapsed (YES in step S506), the bandwidth estimation unit 306 repeats the processes from step S504 and perform processing for estimating an available bandwidth for each predetermined time.

When it is determined, as the determination result of the in step S505, that the time corresponding to the execution interval of estimation processing has not elapsed, (NO in step S506), the bandwidth estimation unit 306 repeats the processes from step S505.

The process in step S507 will be described next with reference to FIG. 5B. Steps S508 to S515 illustrated in FIG. 5B are details of the process in step S507 of FIG. 5A.

First, in step S508, the bandwidth estimation unit 306 serializes the packet trains transmitted to the particular terminal and the existing terminal, and transmits them using the data transmission-reception unit 305. The bandwidth estimation unit 306 calculates an estimated value of the available bandwidth for each terminal apparatus. The process in step S508 will be described below.

First, the transmission scheme decision unit 311, which constitutes the bandwidth estimation unit 306, makes a setting to the scheduling unit 309 so as to transmit the measurement packet trains for the existing terminal and then transmit the measurement packet trains for the particular terminal.

The scheduling unit 309 adjusts the transmission schedule of the measurement packet trains for the existing terminal and the particular terminal, based on the setting. The scheduling unit 309 then transmits the packet trains to respective terminal apparatuses in series, using the data transmission-reception unit 305.

When each terminal apparatus (the existing terminal and the particular terminal) receives the measurement packet trains from the server apparatus 301, this terminal apparatus may execute the same process as in step S504. In this case, the data transmission-reception unit 307 in each terminal apparatus receives the measurement packet trains.

The estimated value calculation unit 308 in each terminal apparatus calculates an estimated value of the available bandwidth between each terminal apparatus and the server apparatus 301, based on the received packet trains. Each of the terminal apparatuses may transmit the estimated value, which is calculated above, to the server apparatus 301 as response data.

The data transmission-reception unit 305 in the server apparatus 301 receives the response data transmitted from each of the terminal apparatuses and transmits the received response data to the collision determination unit 310.

The collision determination unit 310 records in the serialization estimated value 401 of the data storage unit 304, the estimated value of the available bandwidth between each of the terminal apparatuses and the server apparatus 301, included in the received response data. In the present exemplary embodiment, the serialization estimated value 401 may be referred to as a "first estimated value", hereinafter.

The bandwidth estimation unit 306 executes step S509 after elapse of the time, which is recorded in the estimation interval information 405. The bandwidth estimation unit 306 may execute step S509 without waiting the time corresponding to the execution interval.

In step S509, the bandwidth estimation unit 306 parallelizes the packet trains for the particular terminal and the existing terminal, and transmits them using the data transmission-reception unit 305 to calculate an estimated value of the available bandwidth for each terminal apparatus. The process in step S509 will be described below.

First, the transmission scheme decision unit 311 makes a setting the scheduling unit 309 so as to transmit the measurement packet trains for the particular terminal in parallel with transmission of the measurement packet trains for the existing terminal.

The scheduling unit 309 adjusts the transmission schedule of the measurement packet trains for the existing terminal and the particular terminal, based on the setting. The scheduling unit 309 transmits the packet trains to respective terminal apparatuses in parallel, using the data transmission-reception unit 305.

More specifically, the scheduling unit 309 may, for example, adjust the transmission schedule so as to insert packets, which is components of measurement packet trains for the particular terminal, between a plurality of packets, which is components measurement packet trains for the existing terminal and then transmit the measurement packet trains.

When, for example, a plurality of connection paths are defined from the data transmission-reception unit 305 to the communication network 103, the scheduling unit 309 may adjust the transmission schedule so as to transmit measurement packet trains to respective terminal apparatuses in parallel from each path.

When each terminal apparatus (the existing terminal and the particular terminal) receives the measurement packet trains from the server apparatus 301, this terminal apparatus may execute the same process as in step S508. In this case, the data transmission-reception unit 307 in each terminal apparatus receives the measurement packet trains. The estimated value calculation unit 308 in each terminal apparatus calculates an estimated value of the available bandwidth between each terminal apparatus and the server apparatus 301, based on the received packet trains. Terminal apparatuses may transmit the estimated value, which is calculated above to the server apparatus 301 as response data.

The data transmission-reception unit 305 in the server apparatus 301 receives response data which include the estimated value of the available bandwidth and which are transmitted from terminal apparatuses, and transfers the received response data to the collision determination unit 310.

The collision determination unit 310 records in the parallelization estimated value 402 of the data storage unit 304, the estimated value of the available bandwidth between each of the terminal apparatuses and the server apparatus 301, included in the received response data. In the present exemplary embodiment, the parallelization estimated value 402 may be referred to as a "second estimated value", hereinafter.

The collision determination unit 310 then compares the first estimated value (serialization estimated value) with the second estimated value (parallelization estimated value) for each of the terminal apparatuses (the particular terminal and the existing terminal). The collision determination unit 310 determines whether the estimated value of the available bandwidth has lowered for both the particular terminal and at least one existing terminal above, based on the result of the comparison (step S510).

More specifically, the collision determination unit 310 calculates the value of (First Estimated Value (Serialization Estimated Value))÷(Second Estimated Value (Parallelization Estimated Value)) for each of the particular terminal and the existing terminal. The collision determination unit 310 compares the calculated value with the collision determination information 403 recorded in the data storage unit 304. When the measurement packet trains have not collided, the serialization estimated value and the parallelization estimated value are less likely to deviate from each other considerably. On the other hand, when the measurement packet trains have collided, because the parallelization estimated value becomes larger than the serialization estimated value, the aforementioned calculated value of (First Estimated Value (Serialization Estimated Value))÷(Second Estimated Value (Parallelization Estimated Value)) is expected to become smaller than the collision determination information 403. When it is determined, as a result of the comparison, that the calculated value is smaller than the collision determination information 403 for both the particular terminal and at least one existing terminal above, the collision determination unit 310 may determine that the measurement packet trains have collided in the path of the communication network, for each of these terminal apparatuses.

More specifically, when the estimated value of the available bandwidth has lowered for both the particular terminal and at least one existing terminal as mentioned above, the collision determination unit 310 may determine that measurement packet trains for these terminal apparatuses have collided on the communication network.

When it is determined in step S510 that the estimated value of the available bandwidth has lowered for both the particular terminal and the at least one existing terminal (YES in step S511), the collision determination unit 310 determines to serialize and transmit the measurement packets for the particular terminal and the at least one existing terminal (step S512).

After step S512, in step S513 the bandwidth estimation unit 306 may periodically execute the same process as in step S508 at the time interval recorded in the estimation interval information 405. In other words, the bandwidth estimation unit 306 may repeatedly execute processing for serializing and transmitting measurement packet trains for the particular terminal and the existing terminal at a specific time interval, to estimate an available bandwidth for each terminal apparatus.

When it is determined in step S510 that the estimated value of the available bandwidth has not lowered for the particular terminal or the at least one existing terminal (NO in step S514), the collision determination unit 310 determines to parallelize and transmit the measurement packets to be transmitted to the particular terminal and the at least one existing terminal (step S514).

After step S514, in step S515 the bandwidth estimation unit 306 may periodically execute the same process as in step S509 at the time interval recorded in the estimation interval information 405. In other words, the bandwidth estimation unit 306 may repeatedly execute processing for parallelizing and transmitting measurement packet trains to be transmitted to the particular terminal and the existing terminal, at a specific time interval to estimate an available bandwidth for each terminal apparatus.

With the aforementioned operation, the bandwidth estimation unit 306 in the present exemplary embodiment may determine whether the measurement packet trains transmitted to respective terminal apparatuses have collided on the communication network (communication path), based on the result of determination as to whether the estimated value of the available bandwidth lowers or not.

For each terminal apparatus for which the measurement packet trains do not collide with each other, the bandwidth estimation unit 306 in the present exemplary embodiment can estimate the available bandwidth in a short time with high precision by transmitting the measurement packet trains in parallel. For each terminal apparatus for which the measurement packet trains collide with each other, the bandwidth estimation unit 306 can estimate the available bandwidth with high precision by transmitting the measurement packet trains in series to avoid collision of the packet trains.

Figure 6:
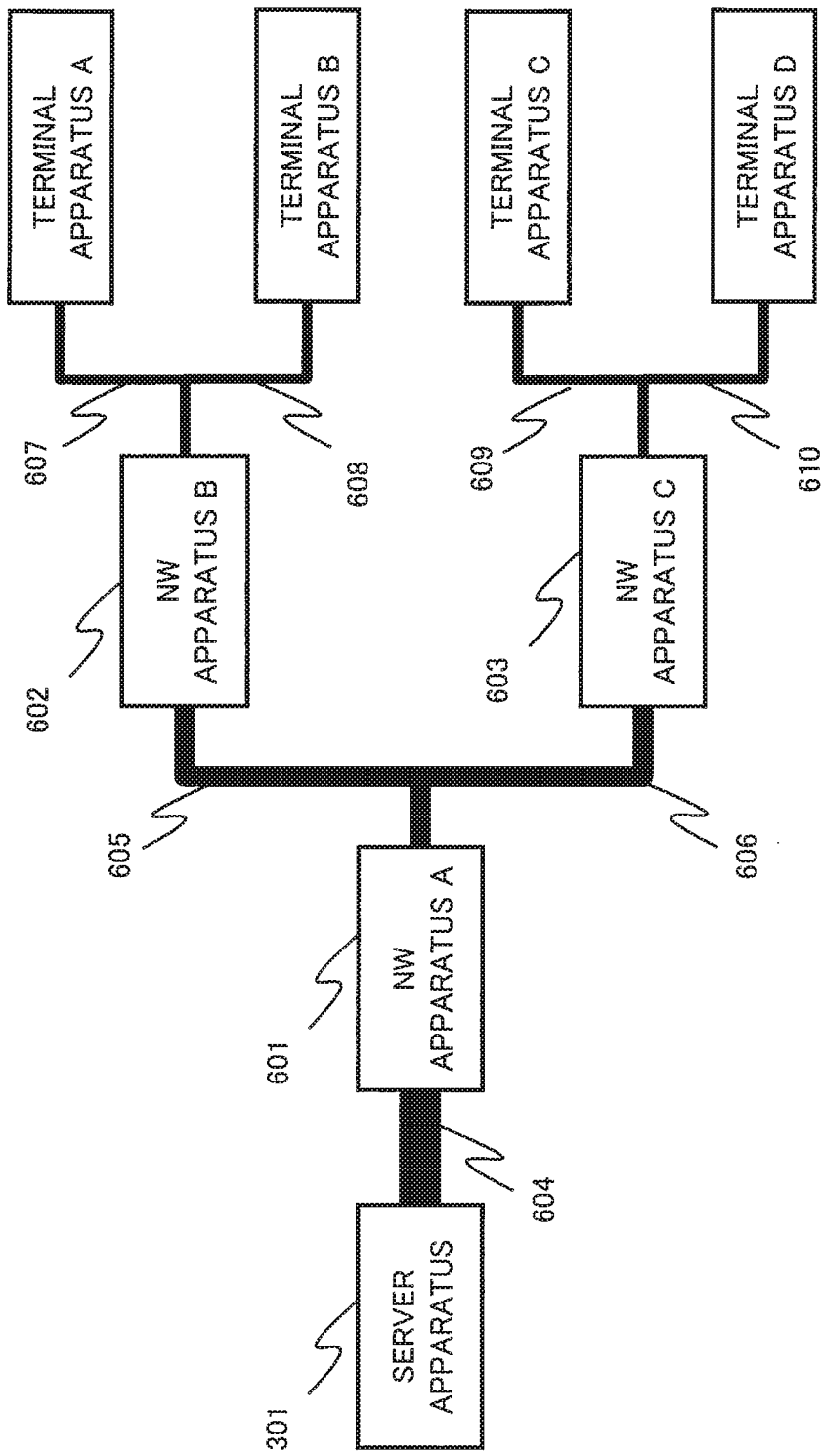
FIG. 6 is a view illustrating a specific example of a communication network that connects a server apparatus and terminal apparatuses to each other in the second exemplary embodiment of the present invention.
Figure 7:
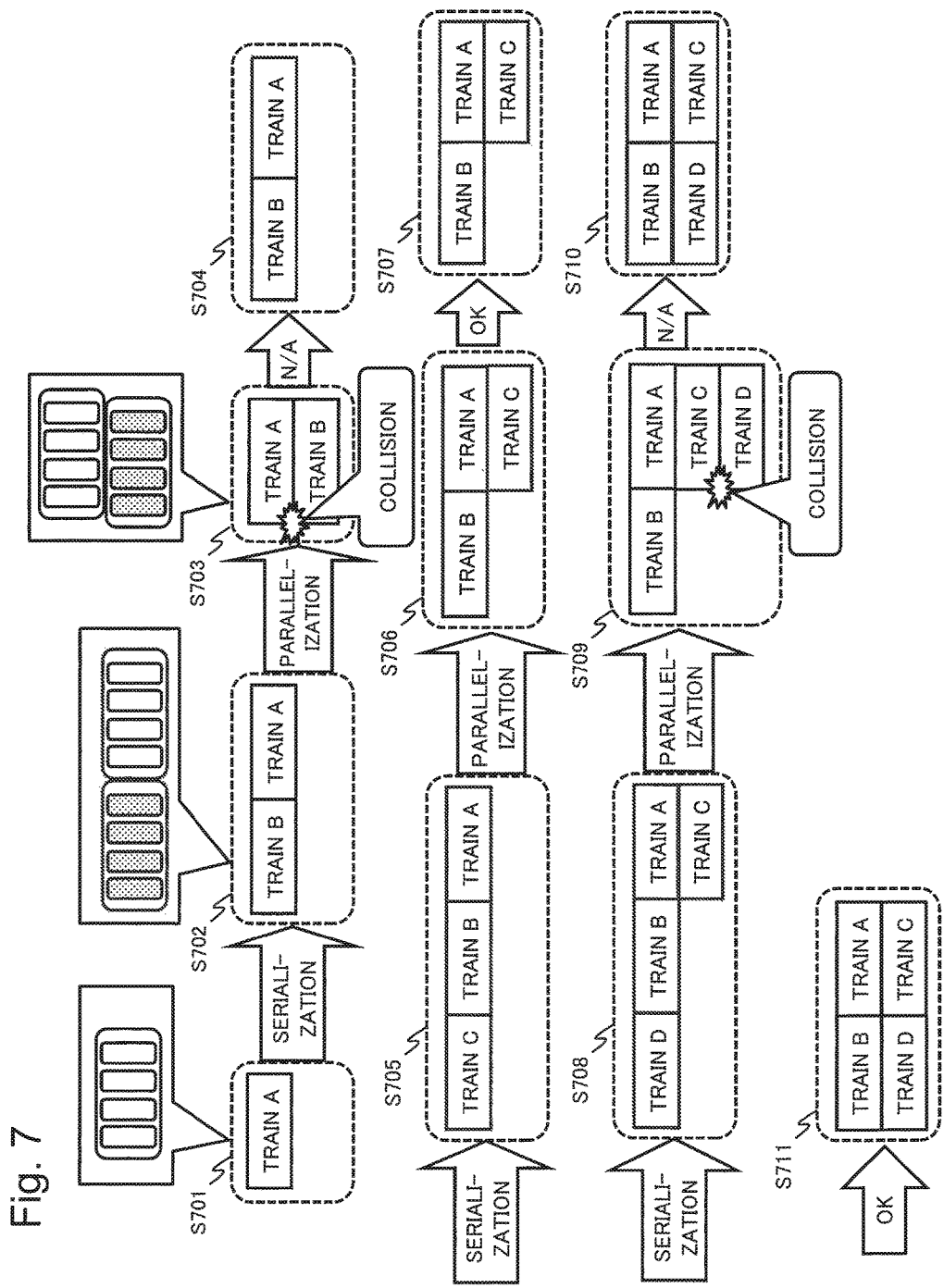
FIG. 7 is a diagram schematically illustrating the process of transmitting measurement data in available bandwidth estimation processing according to the second exemplary embodiment of the present invention.

Details of processing for estimating an available bandwidth in the above-described present exemplary embodiment will be described next with reference to an example illustrated in FIGS. 6 and 7. FIG. 6 is a diagram illustrating an example of a communication network that connects a server apparatus and terminal apparatuses in the second exemplary embodiment of the present invention. FIG. 7 is a diagram schematically illustrating the process of transmitting measurement data in available bandwidth estimation processing according to the second exemplary embodiment of the present invention. The specific example illustrated in FIGS. 6 and 7 is merely an example used to describe processing for estimating an available bandwidth in the present exemplary embodiment, and the present exemplary embodiment is not limited to this.

Referring to the configuration of the specific example illustrated in FIG. 6, terminal apparatuses "A" to "D" are connected to the server apparatus 301 via a plurality of network apparatuses (NW apparatuses) "A" to "C".

NW apparatuses "A" to "C" may serve as various apparatuses equipped with the network connection function, such as routers, switches, base stations (for mobile networks and the like), and access points for wireless communication lines.

Referring to FIG. 6, lines that connect the server apparatus, the NW apparatuses and the terminal apparatuses, indicate communication networks, and the thickness of the lines schematically represents the width of the available bandwidth on the communication network (bandwidth).

More specifically, in the example illustrated in FIG. 6, communication networks (607 and 608 in FIG. 6) between terminal apparatuses "A" and "B" and NW apparatus "B" have an available bandwidth smaller than that of a communication network (605 in FIG. 6) between NW apparatuses "B" and "A". Similarly, communication networks (609 and 610 in FIG. 6) between terminal apparatuses "C" and "D" and NW apparatus "C" have an available bandwidth smaller than that of a communication network (606 in FIG. 6) between NW apparatuses "C" and "A". Furthermore, communication networks (605 and 606 in FIG. 6) between NW apparatuses "B" and "C" and NW apparatus "A" have an available bandwidth smaller than that of a communication network (604 in FIG. 6) between the server apparatus and NW apparatus "A".

FIG. 7 is a diagram schematically illustrating the state of the measurement packet trains when processing for estimating an available bandwidth is executed for terminal apparatuses "A", "B", "C", and "D" in the order named, in the communication network configuration illustrated in FIG. 6.

Referring to FIG. 7, first, terminal apparatus "A" transmits a new request to estimate an available bandwidth to the server apparatus 301. In this case, terminal apparatus "A" serves as the particular terminal.

In response to the request from terminal apparatus "A", the bandwidth estimation unit 306 executes steps S501 to S506 in FIG. 5A. At this time, measurement packet train is formed as illustrated in S701 of FIG. 7. The bandwidth estimation unit 306 and the data transmission-reception unit 305 transmit only packet trains to terminal apparatus "A".

Terminal apparatus "B" serves as the particular terminal to transmit a request to estimate an available bandwidth. In this case, the bandwidth estimation unit 306 executes steps S501, S502, and S507 (steps S508 to S510) in FIGS. 5A and 5B. At this time, measurement packet trains for calculating the serialization estimated value in step S508 are formed as illustrated in step S702 of FIG. 7. Further, measurement packet trains for calculating a parallelization estimated value in step S509 are formed as illustrated in step S703 of FIG. 7.

Terminal apparatuses "A" and "B" are connected to the same, NW apparatus "B" and available bandwidth of the communication network between the NW apparatus and each terminal apparatus is a narrow. Measurement packet trains parallelized as in step S703 collide with each other on the communication network between NW apparatus "B" and each of terminal apparatuses "A" and "B". Upon the collision, the second estimated values (parallelization estimated values) become lower than the first estimated values (serialization estimated values), for terminal apparatuses "A" and "B". Therefore, the collision determination unit 310 determines in step S512 of FIG. 5B, to serialize and transmit measurement packet trains with regard to terminal apparatuses "A" and "B". This avoids collision of measurement packet trains for each terminal apparatus in subsequent measurement process (step S704 in FIG. 7).

Terminal apparatus "C" then serves as the particular terminal to transmit a request to estimate an available bandwidth. In this case, the bandwidth estimation unit 306 executes steps S501, S502, and S507 (steps S508 to S510) in FIGS. 5A and 5B. At this time, measurement packet trains for calculating the serialization estimated value in step S508 are formed as illustrated in step S705 of FIG. 7. Further, measurement packet trains for calculating a parallelization estimated value in step S509 are formed as illustrated in step S706 of FIG. 7.

Terminal apparatuses "C" and "A" are connected to different NW apparatuses and measurement packet trains do not collide with each other. The collision determination unit 310 determines in step S514 of FIG. 5B, to parallelize and transmit measurement packet trains with regard to terminal apparatuses "A" and "C". As a result, measurement packet trains for terminal apparatuses "A" and "C" are transmitted in parallel. Further, measurement packet trains for terminal apparatus "B" are transmitted in series with respect to measurement packet trains for terminal apparatuses "A" and "C" (step S707 in FIG. 7).

Terminal apparatus "D" then serves as the particular terminal to transmit a request to estimate an available bandwidth. In this case, the bandwidth estimation unit 306 executes steps S501, S502, and S507 (steps S508 to S510) in FIGS. 5A and 5B. At this time, measurement packet trains for calculating the serialization estimated value in step S508 are formed as illustrated in step S708 of FIG. 7. Further, measurement packet trains for calculating the parallelization estimated value in step S509 are formed as illustrated in step S709 of FIG. 7.

Terminal apparatuses "C" and "D" are connected to the same, NW apparatus "C", and the available bandwidth of the communication network between NW apparatus "C" and each terminal is narrow. Parallelized measurement packet trains collide with each other on the communication network between NW apparatus "C" and each of terminal apparatuses "C" and "D". Due to the collision, the second estimated values (parallelization estimated values) become lower than the first estimated values (serialization estimated values), for terminal apparatuses "C" and "D". The collision determination unit 310 determines in step S512 of FIG. 5B, to serialize and transmit measurement packet trains with regard to terminal apparatuses "C" and "D".

In this case, the collision determination unit 310 determines that measurement packet trains for terminal apparatus "D" have not collided with measurement packet trains for terminal apparatuses "A" and "B". As a result, measurement packet trains for terminal apparatuses "A" and "C" are transmitted in parallel, while measurement packet trains for terminal apparatuses "B" and "D" are transmitted in series with the measurement packet trains for terminal apparatuses "A" and "C". At this time, measurement packet trains for terminal apparatuses "B" and "D" are transmitted in parallel (steps S710 and S711 in FIG. 7).

More specifically, the bandwidth estimation unit 306 in the present exemplary embodiment determines whether to transmit in series or in parallel measurement packets to respective terminal apparatuses, based on determination whether measurement packet trains for the respective terminal apparatuses collide with each other. As in the example given with reference to FIGS. 6 and 7 mentioned above, packet trains for terminal apparatuses "A" and "C" in which measurement packet trains do not collide with each other are parallelized and transmitted. Similarly, packet trains for terminal apparatuses "B" and "D" in which measurement packet trains do not collide with each other are parallelized and transmitted. Furthermore, measurement packet trains for a set of terminal apparatuses "A" and "B" and a set of terminal apparatuses "C" and "D" in which measurement packet trains collide with each other, are transmitted in series. Although train "D" is placed in series with the trailing edge of train "B" in step S708 illustrated in FIG. 7, for example, train "D" may be placed in series with the trailing edge of train "C". In the latter case, measurement packet trains as illustrated in step S710 and measurement packet trains as illustrated in step S709 are transmitted. In this case, as well, the same result as mentioned above is obtained by the same process as mentioned above.

As described above with reference to the specific example, with the communication server in the present exemplary embodiment, the server apparatus 301 in the present exemplary embodiment can estimate, for a plurality of terminal apparatuses 302 connected to the communication network 103, the available bandwidth between the server apparatus 301 and each terminal apparatus 302 in a short time with high precision.

The above-described exemplary embodiment exemplifies the case where the server apparatus 301 and each terminal apparatus 302 employ the technology disclosed in PTL 1, as a specific method for estimating an available bandwidth. However, a method for estimating an available bandwidth in the present exemplary embodiment is not limited to the technology disclosed in PTL 1. The server apparatus 301 in the present exemplary embodiment may adopt, for example, the technology disclosed in PTL 2, as a method for estimating an available bandwidth. In other words, the server apparatus 301 in the present exemplary embodiment may employ an arbitrary technology capable of estimating an available bandwidth on the communication network between the server apparatus 301 and each terminal apparatus 302.

Third Exemplary Embodiment

A third exemplary embodiment of the present invention will be described below. Characteristic configurations according to the present exemplary embodiment will be mainly described hereinafter. Configurations similar to those in the above-described first and second exemplary embodiments are assigned with the same reference numbers, and a detailed description thereof will be omitted.

Specific configurations in the present exemplary embodiment are similar to the configurations illustrated in FIGS. 3 and 4. The operation of a server apparatus 301 in the present exemplary embodiment is partly different from that of the server apparatus 301 in the above-described second exemplary embodiment illustrated in FIGS. 5A and 5B, and the difference will be explained in the following.

A bandwidth estimation unit 306 in the present exemplary embodiment is different from the above-described second exemplary embodiment, in that the bandwidth estimation unit 306 in the present exemplary embodiment executes, a plurality of times, processing for estimating an available bandwidth for each terminal apparatus 302 and calculates an estimated value based on the result of the plurality of times of execution.

Specifically, the bandwidth estimation unit 306 in the present exemplary embodiment may, for example, execute, a plurality of times, processing for calculating the first estimated value (serialization estimated value) for each terminal apparatus. In other words, the bandwidth estimation unit 306 in the present exemplary embodiment may, for example, execute the process in step S508 of FIG. 5B and then repeat the process in step S508 a plurality of times instead of executing step S509, when the time recorded in estimation interval information 405 has elapsed after execution of step S508 of FIG. 5B.

In this case, the bandwidth estimation unit 306 in the present exemplary embodiment may calculate the average of a plurality of estimated values obtained by the plurality of times of execution, and may determine this average as the first estimated value (serialization estimated value). The bandwidth estimation unit 306 may further record such an average for each terminal in the serialization estimated value 401.

Similarly, the bandwidth estimation unit 306 in the present exemplary embodiment may, for example, execute, a plurality of times, processing for calculating the second estimated value (parallelization estimated value) for each terminal apparatus. In other words, the bandwidth estimation unit 306 in the present exemplary embodiment may, for example, execute the process in step S509 of FIG. 5B and then repeat the process in step S509 a plurality of times instead of executing step S510, when the time recorded in the estimation interval information 405 has elapsed after execution of step S509 of FIG. 5B.

In this case, the bandwidth estimation unit 306 in the present exemplary embodiment may calculate the average of a plurality of estimated values obtained by the plurality of times of execution, and may determine this average as the second estimated value (parallelization estimated value). The bandwidth estimation unit 306 may further record such an average for each terminal in a parallelization estimated value 402.

Similarly, the bandwidth estimation unit 306 in the present exemplary embodiment may, for example, execute, a plurality of times, processing for calculating first and second estimated values for each terminal apparatus, with regard to steps S513 and S514 in FIG. 5B as well.

As described above, the bandwidth estimation unit 306 in the third exemplary embodiment of the present invention executes, a plurality of times, processing for estimating the available bandwidth for each terminal apparatus and determines the average of the execution results as the estimated value of the available bandwidth for each terminal apparatus. Therefore, according to the present exemplary embodiment, it is possible to achieve effect to improve the estimation precision of the available bandwidth for each terminal apparatus, in addition to achieving the same advantageous effects as in the above-mentioned second exemplary embodiment. Furthermore, since the estimation precision of an available bandwidth in steps S508 and S509 improves, the collision determination accuracy in step S510 improves also.

<Hardware Configuration>

A hardware configuration capable of implementing the communication apparatus and each terminal apparatus in each of the above-described exemplary embodiments will be described below.

The communication apparatus 101, the server apparatus 301, and the terminal apparatuses 102 and 302 (to be referred to as a "communication apparatus and the like" hereinafter) in each of the above-described exemplary embodiments may be implemented in dedicated hardware apparatuses that implement respective functions. In this case, respective units illustrated in FIGS. 2 and 3 may be implemented in hardware integrating some or all of them (an integrated circuit or the like implementing processing logic).

Figure 8:
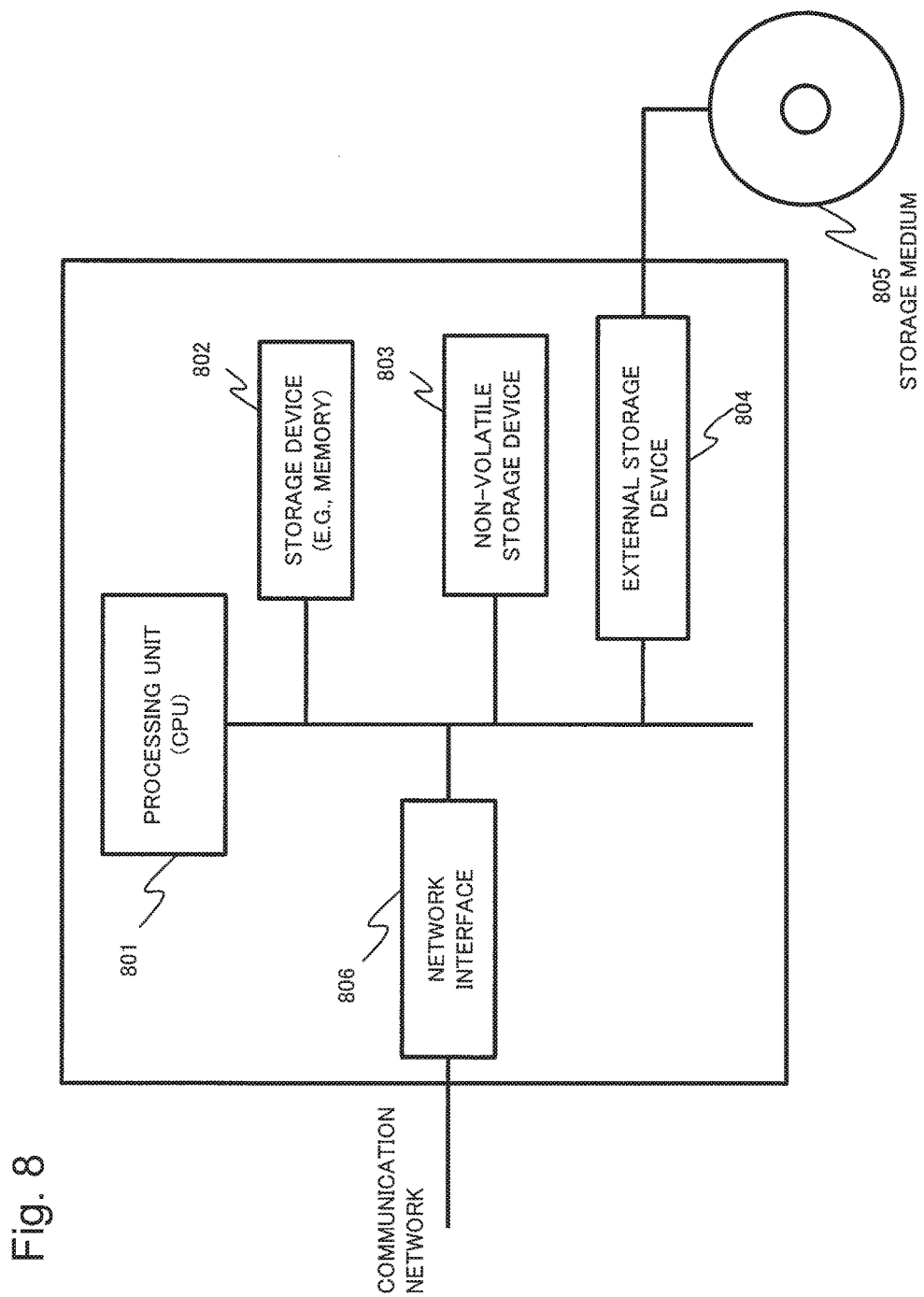
FIG. 8 is a block diagram illustrating an exemplary hardware configuration of an information processing apparatus capable of implementing the communication apparatus and each terminal apparatus according to each exemplary embodiment of the present invention.

The above-mentioned communication apparatus and the like may be implemented using hardware as illustrated in FIG. 8, and various software programs (computer programs) executed by the hardware.

A processing unit 801 illustrated in FIG. 8 serves as an arithmetic processing unit such as a general-purpose CPU (Central Processing Unit) or a microprocessor. The processing unit 801 may, for example, read various software programs stored in a non-volatile storage device 803 (to be described later) to a storage device 802 and execute the processing involved in accordance with the software programs.

The storage device 802 serves as a memory device such as a RAM (Random Access Memory) that may be referred to from the processing unit 801, and stores software programs, various types of data, or the like. The storage device 802 may be a volatile memory device.

The non-volatile storage device 803 is non-volatile memory device such as a magnetic disk drive or a semiconductor storage device implemented in a flash memory, and stores various types of software programs, data, or the like.

A network interface 806 is an interface device connected to a communication network, and may adopt, for example, an interface device for wired or wireless LAN (Local Area Network) connection, or the like.

An external storage device 804 is, for example, a device that processes reading and writing of data to a storage medium 805 (to be described later).

The storage medium 805 is an arbitrary recording medium capable of recording data, such as an optical disk, a magneto-optical disk, a semiconductor flash memory, or the like.

The present invention exemplified by each of the above-described exemplary embodiments may be achieved by, for example, implementing the above-mentioned communication apparatus and the like in the hardware illustrated in FIG. 8, supplying software programs capable of implementing the functions of the flowcharts referred to in each exemplary embodiment to the communication apparatus and the like, and executing the software programs by the processing unit 801.

In the above-described exemplary embodiments, respective units illustrated in FIGS. 2 and 3 can be implemented as software modules that are the functional (processing) unit of the software programs executed by the above-mentioned hardware. Dividing in software modules shown in these drawings is a configuration for convenience of description, and may take various other configurations in implementation.

When, for example, respective units illustrated in FIGS. 2 and 3 are implemented as software modules, these software modules may be stored in the non-volatile storage device 803 and read to the storage device 802 when the processing unit 801 executes each type of processing. These software modules may exchange various types of data with each other, using an appropriate method such as a shared memory or inter-processing communication.

Each of the above-mentioned software programs may be recorded on the storage medium 805 and stored in the non-volatile storage device 803 via the external storage device 804 as appropriate in, for example, the shipment or operation stage of the above-mentioned communication apparatus and the like.

The data storage units 104 and 304 may, for example, store each type of data in a specific area of the non-volatile storage device 803 and read the data to the storage device 802 where necessary.

The data transmission-reception units 105 and 305 may, for example, allow the processing unit 801 to transmit and receive data such as measurement packet trains to and from the communication network via the network interface 806, every time processing for transmitting and receiving of the data occurs.

In the above-mentioned case, as a method for supplying software programs to the above-mentioned communication apparatus and the like, a method for installing the software programs on these devices by using an appropriate tool, in the manufacturing stage before shipment, the maintenance stage after shipment, or the like, can be adopted. Alternatively, as the method for supplying software programs, the currently general procedure, including a method for downloading the software programs from the outside via a communication line such as the Internet, can be adopted. In such a case, the present invention can be considered as being implemented in codes implementing the software programs or a computer-readable storage medium into which the codes have been recorded.

In the above, an example in which the present invention is applied to the above-described exemplary embodiments has been described. However, the technical scope of the present invention is not limited to that described in each of the above-described exemplary embodiments. It is obvious to those skilled in the art that various changes or modifications can be made to the exemplary embodiments. In such a case, new exemplary embodiments including the changes or modifications also fall within the technical scope of the present invention. This is obvious from matters defined in the scope of claims.

Some or all of the above-described exemplary embodiments and their modifications may also be described as in the following supplemental notes. However, the present invention exemplified by the above-described exemplary embodiments and their modifications is not limited to the following description.

(Supplemental Note 1)

A communication apparatus including:
data transmission-reception unit communicably connected to at least one terminal apparatus via a communication line; and
bandwidth estimation unit for
generating particular information to be used to estimate an available bandwidth on the communication line,
determining whether to transmit in series or in parallel the particular information for a particular one of the terminal apparatuses and the particular information for another one of the terminal apparatuses, and
estimating the available bandwidth of the communication line between the communication apparatus and terminal apparatuses, by transmitting, based at least in part on the determination, the particular information for the particular terminal apparatus and the particular information for the another terminal apparatus, with uses of the data transmission-reception unit.

(Supplemental Note 2)

The communication apparatus according to Supplemental Note 1, wherein
the bandwidth estimation unit
determines whether the particular information for the particular terminal apparatus and the particular information for the another terminal apparatus have collided on the communication line, and
based at least in part on the result of the determination on collision, determines whether to transmit in series or in a parallel the particular information for the particular terminal apparatuses and the particular information for the another terminal apparatus.

(Supplemental Note 3)

The communication apparatus according to Supplemental Note 2, wherein
the bandwidth estimation unit determines to transmit, in series, the particular information for the particular terminal apparatus and the particular information for the another terminal apparatus, when the bandwidth estimation unit determines that the particular information for the particular terminal apparatus and the particular information for the another terminal apparatus have collided on the communication line.

(Supplemental Note 4)

The communication apparatus according to Supplemental Note 2 or 3, wherein
the bandwidth estimation unit determines to transmit, in parallel, the particular information for the particular terminal apparatus and the particular information for the another terminal apparatus, when the bandwidth estimation means determines that the particular information for the particular terminal apparatus and the particular information for the another terminal apparatus do not collide on the communication line.

(Supplemental Note 5)

The communication apparatus according to any one of Supplemental Notes 2 to 4, wherein the bandwidth estimation unit obtaining a first estimated value of the available bandwidth with regard to the communication line between the communication apparatus and the terminal apparatuses by use of the data transmission-reception unit to transmit, in series, the particular information for the particular terminal apparatus and the particular information for the another terminal apparatus,
obtaining a second estimated value of the available bandwidth with regard to the communication line between the communication apparatus and each of the terminal apparatuses by use of the data transmission-reception unit to transmit, in parallel, the particular information for the particular terminal apparatus and the particular information for the another terminal apparatus, and
determines whether the particular information for the particular device and the particular information for the another terminal apparatus have collided on the communication line, based on the first estimated value and the second estimated value.

(Supplemental Note 6)

The communication apparatus according Supplemental Note 5, wherein the bandwidth estimation unit determines that the particular information for the particular terminal apparatus and the particular information for the another terminal apparatus have collided on the communication line,
when both of the second estimated value with regard to the communication line between the communication apparatus and the particular terminal apparatus, and the second estimated value with regard to the communication line between the communication apparatus and the another terminal apparatus, are smaller than first estimated value with regard to the communication line between the communication apparatus and respective terminal apparatus.

(Supplemental Note 7)

The communication apparatus according to Supplemental Note 5, wherein
the bandwidth estimation unit determines that the particular information for the particular terminal apparatus and the particular information for the another terminal apparatus have collided on the communication line,
when both a result of dividing the first estimated value with regard to the communication line between the communication apparatus and the particular terminal apparatus by the second estimated value with regard to the communication line between the communication apparatus and the particular terminal apparatus,
and a result of dividing the first estimated value with regard to the communication line between the communication apparatus and another terminal apparatus by the second estimated value with regard to the communication line between the communication apparatus and the another terminal apparatus, are smaller than a specific value.

(Supplemental Note 8)

The communication apparatus according to Supplemental Note 5, wherein the bandwidth estimation unit
obtains the first estimated value and the second estimated value with regard to the communication line between the communication apparatus and the particular terminal apparatus a plurality of times and calculates an average of the first estimated values and an average of the second estimated values,
obtains the first estimated value and the second estimated value for the communication line between the communication apparatus and the another terminal apparatus a plurality of times and calculates an average of the first estimated values and an average of the second estimated values, and determines that the particular information associated with the particular terminal apparatus and the particular information associated with the another terminal apparatus have collided on the communication line, when both a result of dividing the average of the first estimated values with regard to the communication line between the communication apparatus and the particular terminal apparatus by the average of the second estimated values with regard to the communication line between the communication apparatus and the particular terminal apparatus, and a result of dividing the average of the first estimated values with regard to the communication line between the communication apparatus and the another terminal apparatus by the average of the second estimated values for the communication line between the communication apparatus and another terminal apparatus, are smaller than a specific value.

(Supplemental Note 9)

The communication apparatus according to any one of Supplemental Notes 2 to 7, wherein the bandwidth estimation unit includes:

scheduling unit for adjusting a schedule for transmitting the particular information for at least one of the terminal apparatus;

collision determination unit for determining whether the particular information for the particular terminal apparatus and the particular information for the another terminal apparatus have collided on the communication line;

transmission scheme decision unit for determining whether to transmit in series or in parallel manner the particular information for the particular terminal apparatus and the particular information for the another terminal apparatus, based at least in part on the result of determination on collision by the collision determination unit; and data storage unit for storing the first estimated value for each of the one or more terminal apparatus, the second estimated value for each of the one or more the terminal apparatus, a collision determination basis to be used for determination basis in the collision determination unit, and an order of transmission of the particular information for the one or more terminal apparatus.

(Supplemental Note 10)

The communication apparatus according to any one of Supplemental Notes 1 to 9, wherein, when the more than one of the terminal apparatus includes:

an estimation data transmission-reception unit which is connected to the own communication apparatus via the communication network; and an estimated value calculation unit which is configured to calculate an estimated value of the available bandwidth with regard to the communication network based at least in part on the particular information which is received from the own communication apparatus, and to send the estimated value which is calculated above to the own communication apparatus as a response to the particular information, by use of the estimation data transmission-reception unit, the bandwidth estimation unit estimates the available bandwidth of the communication line between the own communication apparatus and the terminal apparatus, based at least in part on the response data from the terminal apparatus.

(Supplemental Note 11)

The communication apparatus according to any one of Supplemental Notes 1 to 10, wherein the particular information includes a plurality of measurement data which is used to measure the available bandwidth of the communication line between own communication apparatus and at least one of the terminal apparatus, the bandwidth estimation unit estimates the available bandwidth of the communication line between the own communication apparatus and at least one of the terminal apparatus, based at least in part on the response data with regard to the measurement data from at least one of the terminal apparatus.

(Supplemental Note 12)

An available bandwidth estimation method for a communication line, the method including, by a communication apparatus communicably connected to at least one terminal apparatus via a communication line:

generating particular information for estimating an available bandwidth on the communication line;

determining whether to transmit in series or in parallel the particular information for a particular one of the terminal apparatuses and the particular information for another one of the terminal apparatuses; and estimating the available bandwidth of the communication line between the communication apparatus and each of the terminal apparatuses, by transmitting, based on the determination, the particular information for the particular terminal apparatus and the particular information for the other terminal apparatuses.

(Supplemental Note 13)

A storage medium on which a program has been recorded, the program being executed by a computer that controls an operation of a communication apparatus communicably connected to at least one terminal apparatus via a communication line, the program causing the computer to execute the processes of:

generating particular information for estimating an available bandwidth on the communication line;

determining whether to transmit in series or in parallel the particular information for a particular one of the terminal apparatuses and the particular information for another one of the terminal apparatuses; and estimating the available bandwidth of the communication line between the communication apparatus and each of the terminal apparatuses by transmitting, based on the determination, the particular information associated with the particular terminal apparatus and the particular information associated with the other terminal apparatuses.

INDUSTRIAL APPLICABILITY

The present invention is applicable in estimating an available bandwidth of a communication network which connects at least one terminal apparatus to a particular communication apparatus. The present invention is applicable, for example, when available bandwidths for a plurality of terminal apparatuses are collectively monitored by a server apparatus, when contents are distributed after their information and quality are adjusted in accordance with an available bandwidth for each of a plurality of terminal apparatuses, or when an optimum communication path is selected from a plurality of communication paths present for a plurality of terminal apparatuses.

This application claims priority based on Japanese Patent Application No. 2013-228292 filed on Nov. 1, 2013, the disclosure of which is incorporated herein by reference in its entirety.

REFERENCE SIGNS LIST 101 communication apparatus
102 terminal apparatus
103 communication network
104 data storage unit
105 data transmission-reception unit
106 bandwidth estimation unit
301 server apparatus
302 terminal apparatus
304 data storage unit
305 data transmission-reception unit
306 bandwidth estimation unit
307 data transmission-reception unit
308 estimated value calculation unit
309 scheduling unit
310 collision determination unit
311 transmission scheme decision unit
401 serialization estimated value
402 parallelization estimated value
403 collision determination information
404 transmission order information
405 estimation interval information
801 arithmetic unit
802 storage device
803 non-volatile storage device
804 external storage device
805 storage medium
806 network interface

What is claimed is:

1. A communication apparatus comprising:
a processor;
a memory storing instructions executable by the processor to:
communicably connect the communication apparatus to at least one terminal apparatus via a communication line; and
generate particular information to be used to estimate an available bandwidth on the communication line,
determine whether to transmit in series or in parallel the particular information for a particular one of the terminal apparatuses and the particular information for another one of the terminal apparatuses,
estimate the available bandwidth of the communication line between the communication apparatus and terminal apparatuses, by transmitting, based at least part on the determination, the particular information for the particular terminal apparatus and the particular information for the another terminal apparatus,
determine whether the particular information for the particular terminal apparatus and the particular information for the another terminal apparatus have collided on the communication line,
based at least part on the result of the determination on collision, determine whether to transmit in series or in a parallel the particular information for the particular terminal apparatuses and the particular information for the another terminal apparatus,
calculate a first estimated value of the available bandwidth with regard to the communication line between the communication apparatus and the terminal apparatuses to transmit, in series, the particular information for the particular terminal apparatus and the particular information for the another terminal apparatus,
calculate a second estimated value of the available bandwidth with regard to the communication line between the communication apparatus and each of the terminal apparatuses to transmit, in parallel, the particular information for the particular terminal apparatus and the particular information for the another terminal apparatus, and
determine whether the particular information for the particular device and the particular information for the another terminal apparatus have collided on the communication line, based on the first estimated value and the second estimated value.

2. The communication apparatus according to claim 1, wherein
the processor executes the instructions to further determine to transmit, in series, the particular information for the particular terminal apparatus and the particular information for the another terminal apparatus, when the processor determines that the particular information for the particular terminal apparatus and the particular information for the another terminal apparatus have collided on the communication line.

3. The communication apparatus according to claim 1, wherein
the processor executes the instructions to further determine to transmit, in parallel, the particular information for the particular terminal apparatus and the particular information for the another terminal apparatus, when the processor determines that the particular information for the particular terminal apparatus and the particular information for the another terminal apparatus do not collide on the communication line.

4. The communication apparatus according to claim 1, wherein
the processor executes the instructions to further determine that the particular information for the particular terminal apparatus and the particular information for the another terminal apparatus have collided on the communication line,
when both a result of dividing the first estimated value with regard to the communication line between the communication apparatus and the particular terminal apparatus by the second estimated value with regard to the communication line between the communication apparatus and the particular terminal apparatus, and
a result of dividing the first estimated value with regard to the communication line between the communication apparatus and another terminal apparatus by the second estimated value with regard to the communication line between the communication apparatus and the another terminal apparatus, are smaller than a specific value.

5. The communication apparatus according to claim 1, wherein the processor executes the instructions to further:
calculate the first estimated value and the second estimated value with regard to the communication line between the communication apparatus and the particular terminal apparatus a plurality of times and calculates an average of the first estimated values and an average of the second estimated values,
calculate the first estimated value and the second estimated value for the communication line between the communication apparatus and the another terminal apparatus a plurality of times and calculates an average of the first estimated values and an average of the second estimated values, and determine that the particular information associated with the particular terminal apparatus and the particular information associated with the another terminal apparatus have collided on the communication line, when both a result of dividing the average of the first estimated values with regard to the communication line between the communication apparatus and the particular terminal apparatus by the average of the second estimated values with regard to the communication line between the communication apparatus and the particular terminal apparatus, and a result of dividing the average of the first estimated values with regard to the communication line between the communication apparatus and the another terminal apparatus by the average of the second estimated values for the communication line between the communication apparatus and another terminal apparatus, are smaller than a specific value.

6. The communication apparatus according to claim 1, wherein the processor executes the instructions to further:

adjust a schedule for transmitting the particular information for at least one of the terminal apparatus;

determine whether the particular information for the particular terminal apparatus and the particular information for the another terminal apparatus have collided on the communication line;

determine whether to transmit in series or in parallel manner the particular information for the particular terminal apparatus and the particular information for the another terminal apparatus, based at least in part on the result of determination on collision; and store:

the first estimated value for each the one or more terminal apparatus, the second estimated value for each of the one or more the terminal apparatus, a collision determination basis to be used for collision determination, and an order of transmission of the particular information for the one or more terminal apparatus.

7. An available bandwidth estimation method for a communication line, the method comprising, by a communication apparatus communicably connected to at least one terminal apparatus via a communication line:

generating particular information for estimating an available bandwidth on the communication line;

determining whether to transmit in series or in parallel the particular information for a particular one of the terminal apparatuses and the particular information for another one of the terminal apparatuses;

estimating the available bandwidth of the communication line between the communication apparatus and each of the terminal apparatuses, by transmitting, based on the determination, the particular information for the particular terminal apparatus and the particular information for the other terminal apparatuses;

determine whether the particular information for the particular terminal apparatus and the particular information for the another terminal apparatus have collided on the communication line;

based at least part on the result of the determination on collision, determining whether to transmit in series or in a parallel the particular information for the particular terminal apparatuses and the particular information for the another terminal apparatus;

calculating a first estimated value of the available bandwidth with regard to the communication line between the communication apparatus and the terminal apparatuses to transmit, in series, the particular information for the particular terminal apparatus and the particular information for the another terminal apparatus;

calculating a second estimated value of the available bandwidth with regard to the communication line between the communication apparatus and each of the terminal apparatuses to transmit, in parallel, the particular information for the particular terminal apparatus and the particular information for the another terminal apparatus; and determining whether the particular information for the particular device and the particular information for the another terminal apparatus have collided on the communication line, based on the first estimated value and the second estimated value.

8. A non-transitory storage medium on which a program has been recorded, the program being executed by a computer that controls an operation of a communication apparatus communicably connected to at least one terminal apparatus via a communication line, the program causing the computer to execute the processes of:

generating particular information for estimating an available bandwidth on the communication line;

determining whether to transmit in series or in parallel the particular information for a particular one of the terminal apparatuses and the particular information for another one of the terminal apparatuses;

estimating the available bandwidth of the communication line between the communication apparatus and each of the terminal apparatuses by transmitting, based on the determination, the particular information associated with the particular terminal apparatus and the particular information associated with the other terminal apparatuses;

determine whether the particular information for the particular terminal apparatus and the particular information for the another terminal apparatus have collided on the communication line;

based at least part on the result of the determination on collision, determining whether to transmit in series or in a parallel the particular information for the particular terminal apparatuses and the particular information for the another terminal apparatus;

calculating a first estimated value of the available bandwidth with regard to the communication line between the communication apparatus and the terminal apparatuses to transmit, in series, the particular information for the particular terminal apparatus and the particular information for the another terminal apparatus;

calculating a second estimated value of the available bandwidth with regard to the communication line between the communication apparatus and each of the terminal apparatuses to transmit, in parallel, the particular information for the particular terminal apparatus and the particular information for the another terminal apparatus; and determining whether the particular information for the particular device and the particular information for the another terminal apparatus have collided on the communication line, based on the first estimated value and the second estimated value.

* * * * *